United States Patent
Ito

(10) Patent No.: US 11,943,560 B2
(45) Date of Patent: Mar. 26, 2024

(54) INFORMATION PROCESSING APPARATUS, IMAGE GENERATION APPARATUS, INFORMATION PROCESSING METHOD, IMAGE GENERATION METHOD, AND STORAGE MEDIUM FOR GENERATING VIRTUAL VIEWPOINT IMAGES WITH ADDITIONAL INFORMATION

(71) Applicant: CANON KABUSHIKI KAISHA, Tokyo (JP)

(72) Inventor: Hiroyasu Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/540,270

(22) Filed: Dec. 2, 2021

(65) Prior Publication Data
US 2022/0182559 A1    Jun. 9, 2022

(30) Foreign Application Priority Data

Dec. 8, 2020    (JP) ................................. 2020-203296

(51) Int. Cl.
*H04N 5/272*    (2006.01)
*G06T 15/20*    (2011.01)

(52) U.S. Cl.
CPC ........... *H04N 5/2723* (2013.01); *G06T 15/20* (2013.01); *G06T 2200/24* (2013.01)

(58) Field of Classification Search
None
See application file for complete search history.

(56) References Cited

U.S. PATENT DOCUMENTS

| 2014/0059588 | A1* | 2/2014 | Sakamoto | H04N 21/472 725/32 |
| 2015/0304698 | A1* | 10/2015 | Redol | G06Q 30/00 725/23 |
| 2018/0246631 | A1* | 8/2018 | Maruyama | G06T 1/0007 |
| 2019/0199997 | A1* | 6/2019 | Mizuno | G06T 7/50 |
| 2020/0234495 | A1* | 7/2020 | Nakao | G06T 15/20 |
| 2020/0404240 | A1 | 12/2020 | Ito | |
| 2021/0136344 | A1* | 5/2021 | Nakamoto | H04N 13/183 |
| 2022/0036591 | A1 | 2/2022 | Ito | |

FOREIGN PATENT DOCUMENTS

| JP | 2014-41259 A | 3/2014 | |
| JP | 2018049591 A | * 3/2018 | ......... G06Q 30/0241 |

OTHER PUBLICATIONS

Liu et al., 'ICT: attention-based virtual content insertion', Multimedia Systems, vol. 18, pp. 201-214. (Year: 2012).*

* cited by examiner

*Primary Examiner* — Patrick F Valdez
(74) *Attorney, Agent, or Firm* — Carter, DeLuca & Farrell LLP

(57) ABSTRACT

The information processing apparatus includes: one or more processors functioning by executing instructions stored in one or more memories as the following units: a setting unit configured to set a parameter with which a display condition of additional information that is displayed in a virtual viewpoint image, identification information indicating the additional information, and virtual viewpoint information on a virtual viewpoint image that is generated are associated; and an output unit configured to output a parameter that is set by the setting unit.

9 Claims, 21 Drawing Sheets

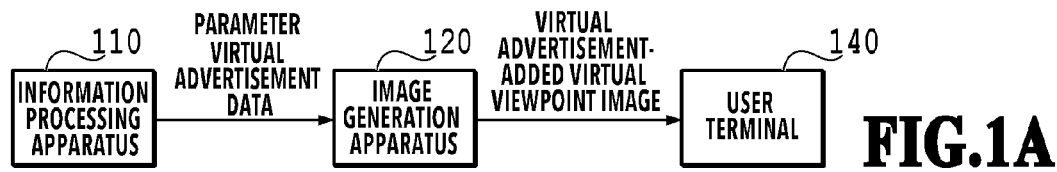
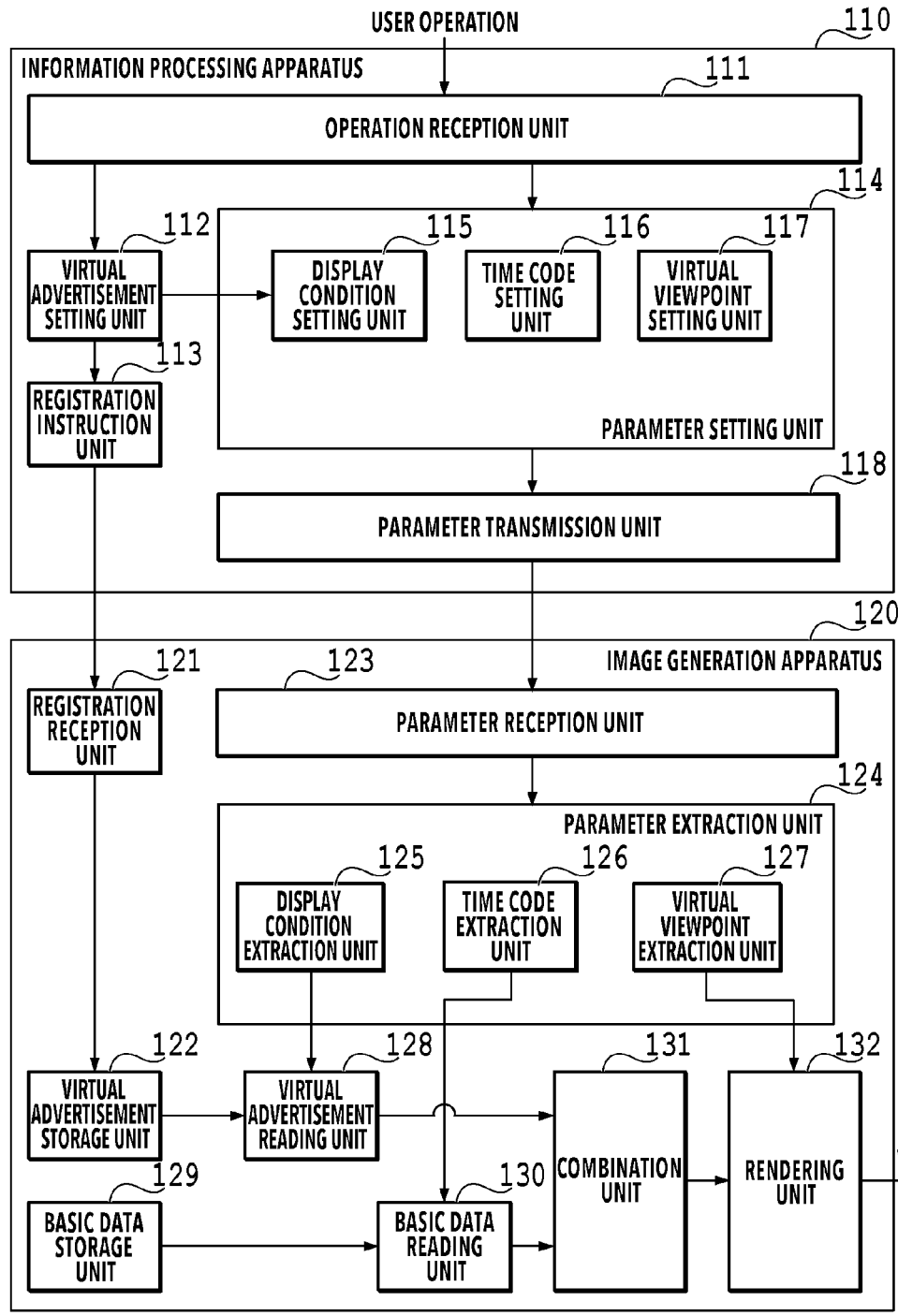
FIG.1A
FIG.1B

VIRTUAL ADVERTISEMENT DATA REGISTRATION

```
{\n
  "virtual advertise" : [
    "advertise ID" : "A",
    "advertise obj file" :" xxx.obj",
    "advertise obj file size" :" 56000"
    "advertise mtl file" :" xxx.mtl",
    "advertise mtl file size" :" 8000"
    "advertise png file" :" xxx1.png",
    "advertise png file size" :" 36000"
    "advertise png file" :" xxx2.png",
    "advertise png file size" :" 24000"
  ]\n
FFFFFFFFFFFFFFFF...FF
}\n\n
```

FIG.6A

VIRTUAL VIEWPOINT IMAGE GENERATION PARAMETER (WITHOUT VIRTUAL ADVERTISEMENT)

```
{\n
    "rotation quaternion" : [0.500000, -0.500000, 0.500000, -0.500000],\n
    "translation vector" : [123.399971, 0.000000, 0.000031],\n
    "horizontal angle" : 50.000000,\n
    "time code" : "00;33;21;45",\n
}\n\n
```

FIG.6B

VIRTUAL VIEWPOINT IMAGE GENERATION PARAMETER (WITH VIRTUAL ADVERTISEMENT)

```
{\n
    "rotation quaternion" : [0.500000, -0.500000, 0.500000, -0.500000],\n
    "translation vector" : [123.399971, 0.000000, 0.000031],\n
    "horizontal angle" : 50.000000,\n
    "time code" : "00;33;21;45",\n
    "advertise display" : "A",\n
}\n\n
```

FIG.6C

```
mtllib xxx.mtl
g xxx
v 67094.210938 -17727.574219 -85.091438
v 67076.593750 -35630.402344 -30.895414
v 67083.632812 -35619.886719 868.098328
v 67109.687500 -17735.855469 810.909790
vt 0.999272 0.962996
vt 0.000472 0.959762
vt 0.000458 0.000022
vt 0.999364 0.000187
vn -0.9999 0.0013 0.0125
usemtl xxx
s 1
f 1/1/1 2/2/1 3/3/1 4/4/1
```

FIG.7

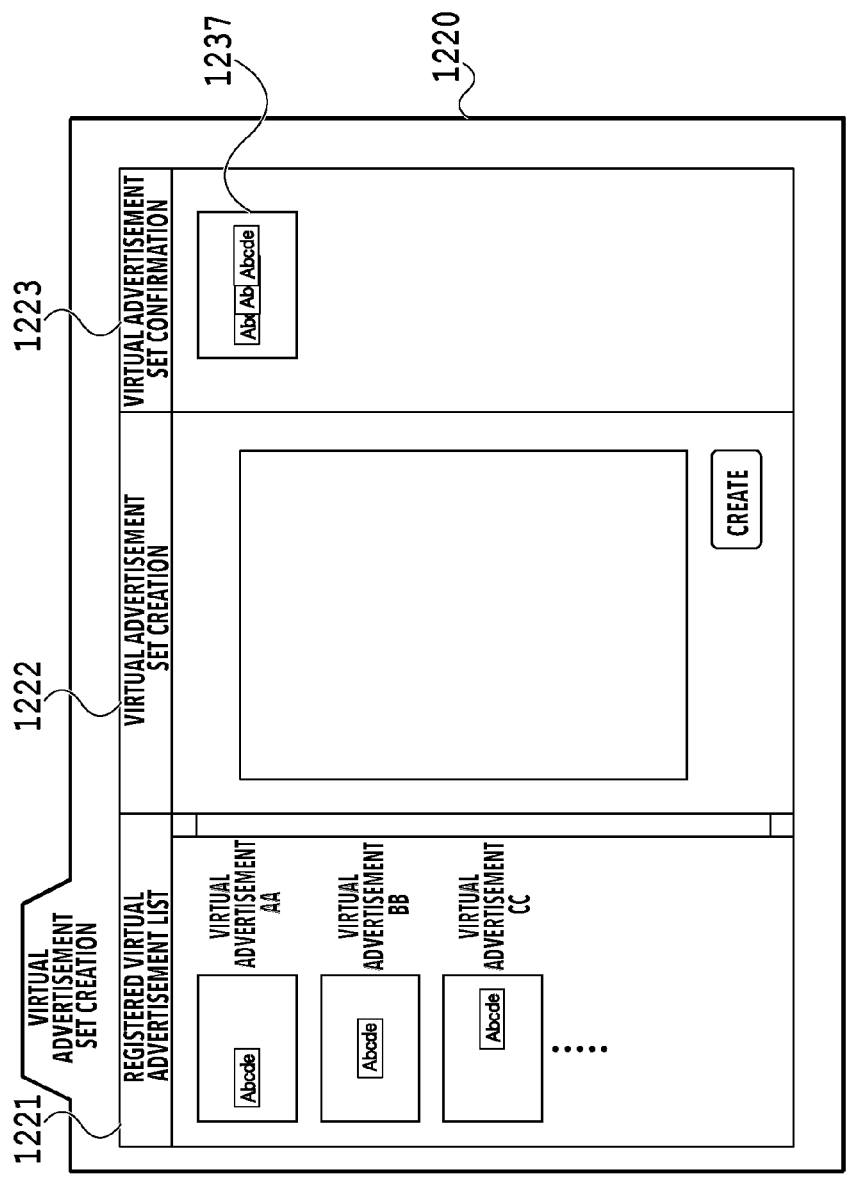

VIRTUAL ADVERTISEMENT DATA REGISTRATION

```
{¥n
 "virtual advertise" : {
   "advertise ID" : "AAAA" ,
   "advertise obj file" :" yyy.obj" ,
   "advertise obj file size" :" 59000"
   "advertise mtl file" :" yyy.mtl" ,
   "advertise mtl file size" :" 7000"
   "advertise mp4 file" :" yyy.mp4" ,
   "advertise mp4 file size" :" 360000"
}¥n
FFFFFFFFFFFFFFFFF…FF
}¥n¥n
```

FIG.16A

VIRTUAL VIEWPOINT IMAGE GENERATION PARAMETER (WITH VIRTUAL ADVERTISEMENT)

```
{¥n
    "rotation quaternion" : [0.500000, -0.500000, 0.500000, -0.500000],¥n
    "translation vector" : [123.399971, 0.000000, 0.000031],¥n
    "horizontal angle" : 50.000000,¥n
    "time code" : "00;33;21;45",¥n
    "advertise display" : "AAAA:FWD", ¥n
}¥n¥n
```

FIG.16B

INFORMATION PROCESSING APPARATUS, IMAGE GENERATION APPARATUS, INFORMATION PROCESSING METHOD, IMAGE GENERATION METHOD, AND STORAGE MEDIUM FOR GENERATING VIRTUAL VIEWPOINT IMAGES WITH ADDITIONAL INFORMATION

BACKGROUND OF THE INVENTION

Field

The present disclosure relates to a technique to generate a virtual viewpoint image.

Description of the Related Art

In recent years, a technique has been attracting attention, which performs synchronous image capturing from a plurality of viewpoints by installing a plurality of cameras at different positions and generates a virtual viewpoint image (also called free-viewpoint video) representing an appearance from an arbitrary virtual viewpoint by using a multi-viewpoint image obtained by the image capturing. By the technique such as this, for example, it is made possible to view a highlight scene in a game of soccer or basketball from a variety of angles, and therefore, it is made possible to give a user a high feeling of being at a live performance compared to normal video contents.

It has been discussed that a variety of kinds of information are added to the virtual viewpoint image such as this. Japanese Patent Laid-Open No. 2014-41259 has disclosed a technique to add advertisement information that is set in advance to a predetermined area in a free-viewpoint video in a case where the viewpoint condition corresponding to the free-viewpoint video is the same as the specific viewpoint condition that is set in advance.

SUMMARY

Note that with the technique of Japanese Patent Laid-Open No. 201441259, even though there is an area to which advertisement information can be added in the frame of the free-viewpoint video, in a case where the viewpoint condition corresponding to the free-viewpoint video is different from the specific viewpoint condition that is set in advance, it is not possible to add advertisement information.

An object of the present disclosure is to provide a technique to generate a virtual viewpoint image in which desired information is added to a desired position.

An information processing apparatus according to one aspect of the present disclosure is an information processing apparatus including: one or more processors functioning by executing instructions stored in one or more memories as the following units: a setting unit configured to set a parameter with which a display condition of additional information that is displayed in a virtual viewpoint image, identification information indicating the additional information, and virtual viewpoint information on a virtual viewpoint image that is generated are associated; and an output unit configured to output a parameter that is set by the setting unit.

Further features of the present disclosure will become apparent from the following description of exemplary embodiments with reference to the attached drawings.

BRIEF DESCRIPTION OF THE DRAWINGS

FIG. 1A and FIG. 1B are each a diagram for explaining an image processing system;

FIG. 6A to FIG. 6C are each a diagram showing a virtual advertisement data registration example and a virtual viewpoint image generation parameter example:

FIG. 7 is a diagram showing an example of an obj file designated in a 3D model format of virtual advertisement data:

FIG. 13A to FIG. 13C are each a diagram explaining creation of a virtual advertisement set:

FIG. 16A and FIG. 16B are each a diagram showing a virtual advertisement data registration example and a virtual viewpoint image generation parameter example.

DESCRIPTION OF THE EMBODIMENTS

Figure 2:
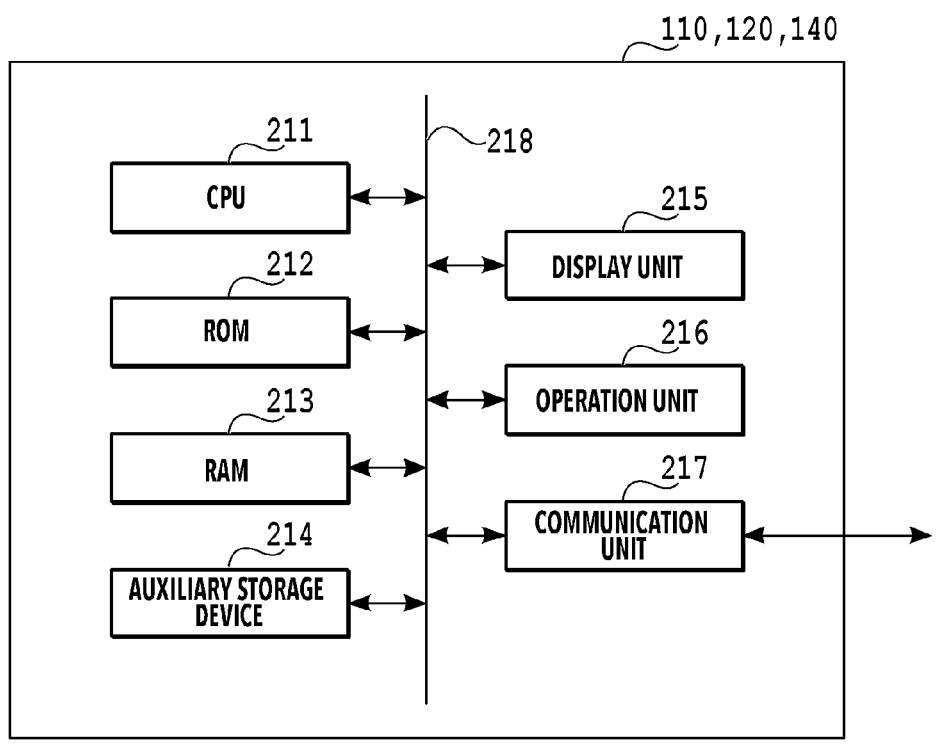
FIG. 2 is a diagram showing a hardware configuration example of an apparatus.

In the following, the present embodiments are explained with reference to the drawings. The following embodiments are not necessarily intended to limit the present invention. Further, all combinations of features explained in the present embodiments are not necessarily indispensable to the solution of the present invention.

First Embodiment

In the present embodiment, an image processing system that generates a virtual viewpoint image representing a virtual advertisement, which is one kind of additional information that does not exist in an addition-target virtual viewpoint image is explained by using diagrams. FIG. 1A and FIG. 1B are each a diagram for explaining the image processing system according to the present embodiment and FIG. 1A shows a configuration example of the image processing system and FIG. 1B shows a function block of the image processing system.

The image processing system of the present embodiment has an information processing apparatus 110, an image generation apparatus 120 that is connected to the information processing apparatus 110, and a user terminal 140 that is connected to the image generation apparatus 120. The connection between each apparatus may be wired or wireless.

The information processing apparatus 110 is an apparatus that provides a parameter for generating a virtual viewpoint image in which additional information is displayed. Specifically, the information processing apparatus 110 is an apparatus that performs instructions to register virtual advertisement data, setting of information relating to a set display condition of virtual advertisement data, a time code, and virtual viewpoint information to a parameter, and transmission of the information to the image generation apparatus 120. The information processing apparatus 110 has an operation reception unit 111, a virtual advertisement setting unit 112, a registration instruction unit 113, a parameter setting unit 114, and a parameter transmission unit 118.

The operation reception unit 111 receives an input of a user operation (also referred to as user input). Information that is generated in accordance with the received input operation is sent to each function unit in accordance with the operation contents. The virtual advertisement setting unit 112 sets virtual advertisement data that is combined with a virtual viewpoint video (that is added onto virtual viewpoint image) in accordance with the information that is sent from the operation reception unit 111. The virtual advertisement data is, for example, image data of an advertisement signboard that does not exist in an addition-target virtual viewpoint image (basic 3D data). The virtual advertisement data that is set may be one or a plurality of pieces of virtual advertisement data may be set, and one kind or a plurality of kinds of virtual advertisement data may be set. As the virtual advertisement data that is set, for example, there is data of an image (see FIG. 3B) that is generated based on a 3D model of a virtual advertisement, whose details will be described later. The virtual advertisement data that is set in the virtual advertisement setting unit 112 is sent to the registration instruction unit 113 and a display condition setting unit 115 of the parameter setting unit 114.

The registration instruction unit 113 gives instructions to register the virtual advertisement data that is set by the virtual advertisement setting unit 112 in the image generation apparatus 120. Specifically, the registration instruction unit 113 sends, together with the set virtual advertisement data, instructions information on the instructions to register the virtual advertisement data to a registration reception unit 121 of the image generation apparatus 120 and instructs the registration reception unit 121 to register the virtual advertisement data that is sent in the image generation apparatus 120.

The parameter setting unit 114 has the display condition setting unit 115, a time code setting unit 116, and a virtual viewpoint setting unit 117. The parameter setting unit 114 sets various kinds of information to a virtual viewpoint image generation parameter (in the following, also referred to as parameter) in accordance with the input operation received by the operation reception unit 111 for each frame of the virtual viewpoint image that is generated by the image generation apparatus 120. That is, the parameter is information for each frame of the virtual viewpoint image that is generated by the image generation apparatus 120 and information to which various kinds of information are set. The parameter to which various kinds of information are set is sent to the parameter transmission unit 118.

The display condition setting unit 115 selects setting-target virtual advertisement data from among the virtual advertisement data that is set by the virtual advertisement setting unit 112 in accordance with the information received from the operation reception unit 111. Then, the display condition setting unit 115 sets identification information uniquely indicating the display condition of the selected virtual advertisement data and the selected virtual advertisement to the parameter. The display condition includes the display start time, the display period of time and the like of the selected virtual advertisement.

The time code setting unit 116 sets a time code to generate a virtual viewpoint image to the parameter in accordance with the information received from the operation reception unit 111. The time code that is set corresponds to the time code associated with basic 3D data corresponding to the virtual viewpoint image, whose details will be described later.

The virtual viewpoint setting unit 117 sets virtual viewpoint information including the position of a virtual viewpoint, a view direction from the virtual viewpoint, and an angle of view of the virtual viewpoint as a parameter in accordance with the information received from the operation reception unit 111. In the following explanation, for convenience, explanation is given by replacing the virtual viewpoint with a virtual camera. That is, the position of the virtual viewpoint, the view direction from the virtual viewpoint, and the angle of view of the virtual viewpoint respectively correspond to the position of the virtual camera, the orientation of the virtual camera, and the angle of view of the virtual camera. The virtual viewpoint information may not include all of the position of the virtual viewpoint, the view direction from the virtual viewpoint, and the angle of view of the virtual viewpoint and the virtual viewpoint information may be configured to include at least one of them.

The parameter transmission unit 118 outputs the parameter to which the information on the condition and the like is set in each of the display condition setting unit 115, the time code setting unit 116, and the virtual viewpoint setting unit 117 to the outside of the information processing apparatus 110. Specifically, the parameter transmission unit 118 transmits the parameter to which various kinds of information are set to a parameter reception unit 123 of the image generation apparatus 120. It may also be possible for the parameter transmission unit 118 to transmit the parameters one by one or a plurality of the parameters at a time. A set of a plurality of parameters continuous from a certain time to another time is also referred to as a virtual camera path because the locus of the virtual viewpoint forms a path.

The image generation apparatus 120 is an apparatus that generates a virtual viewpoint image in which a virtual advertisement is displayed for each frame in accordance with the parameter received from the information processing apparatus 110. That is, it can be said that the image generation apparatus 120 is an apparatus that generates a virtual viewpoint image in which a desired virtual advertisement is added to a desired position. The image generation apparatus 120 has the registration reception unit 121, a virtual advertisement storage unit 122, the parameter reception unit 123, a parameter extraction unit 124, a virtual advertisement reading unit 128, a basic data storage unit 129, a basic data reading unit 130, a combination unit 131, and a rendering unit 132.

The registration reception unit 121 receives the instructions information and the virtual advertisement data for which registration instructions are given from the registration instruction unit 113 of the information processing apparatus 110. The registration reception unit 121 sends the received virtual advertisement data to the virtual advertisement storage unit 122 in order to register the virtual advertisement data in accordance with the instructions information.

The virtual advertisement storage unit 122 stores the virtual advertisement data that is sent from the registration reception unit 121.

The parameter reception unit 123 acquires the parameter to which the display condition of additional information that is displayed in the virtual viewpoint image, the identification information uniquely indicating the additional information, the virtual viewpoint information on the virtual viewpoint image that is generated, and the time code are set. Specifically, the parameter reception unit 123 receives the parameter that is transmitted from the parameter transmission unit 118 of the information processing apparatus 110.

The parameter extraction unit 124 has a display condition extraction unit 125, a time code extraction unit 126, and a virtual viewpoint extraction unit 127. The parameter extraction unit 124 extracts various kinds of information that are set in each function unit from the parameter received by the parameter reception unit 123.

The display condition extraction unit 125 extracts, from the parameter received by the parameter reception unit 123, the identification information on the virtual advertisement data that is set in the display condition setting unit 115 and the information relating to the display condition of the virtual advertisement data, which are included in the parameter. The identification information on the virtual advertisement data and the information relating to the display condition of the virtual advertisement data are sent to the virtual advertisement reading unit 128.

The virtual advertisement reading unit 128 reads the virtual advertisement data corresponding to the identification information extracted from the parameter by the display condition extraction unit 125 from the virtual advertisement storage unit 122. The read virtual advertisement data is sent to the combination unit 131.

The basic data storage unit 129 stores 3D data of a basic model (in the following, referred to as basic 3D data). The basic 3D data is data obtained by three-dimensionally modeling an object that exists actually. A virtual viewpoint image is generated by using the basic 3D data, and therefore, it can also be said that the basic 3D data is shape data indicating the shape of an object included in the virtual viewpoint image that is generated.

The time code extraction unit 126 extracts the time code that is included in the parameter from the parameter received by the parameter reception unit 123. The extracted time code is data that is set by the time code setting unit 116 and matches with the time code of the basic 3D data. The extracted time code is sent to the basic data reading unit 130. The parameter from which the time code is extracted is the same as the parameter that is the extraction target of the display condition extraction unit 125.

The basic data reading unit 130 reads the basic 3D data relevant (corresponding) to the time code extracted by the time code extraction unit 126 from the basic data storage unit 129. The read basic 3D data is sent to the combination unit 131.

The combination unit 131 combines the basic 3D data read by the basic data reading unit 130 and the virtual advertisement data read by the virtual advertisement reading unit 128 and generates one piece of combined 3D data. The generated one piece of combined 3D data is sent to the rendering unit 132.

The virtual viewpoint extraction unit 127 extracts, from the parameter received by the parameter reception unit 123, the virtual viewpoint information (virtual camera position information) indicating the position of the virtual camera, the orientation of the virtual camera, and the angle of view corresponding to the virtual camera, which are included in the parameter. The extracted virtual viewpoint information is sent to the rendering unit 132. The parameter from which the virtual viewpoint information is extracted is the same as the parameter that is the extraction target of the display condition extraction unit 125.

The rendering unit 132 generates a virtual viewpoint image in which a virtual advertisement is displayed (virtual advertisement-added virtual viewpoint image) by performing rendering processing for the combined 3D data that is generated in the combination unit 131 in accordance with the virtual viewpoint information extracted by the virtual viewpoint extraction unit 127. The virtual viewpoint information includes the position and orientation of the virtual camera and the angle of view corresponding to the virtual camera. The generated virtual advertisement-added virtual viewpoint image is sent to the user terminal 140 and the like outside the image generation apparatus 120.

The user terminal 140 is an apparatus that displays the virtual advertisement-added virtual viewpoint image that is sent from the image generation apparatus 120. The user terminal 140 may be an information processing apparatus, such as a personal computer including a liquid crystal display, a tablet terminal including a touch panel, and a smartphone.

Although the image processing system having the information processing apparatus 110, the image generation apparatus 120, and the user terminal 140 is explained as an example, the image processing system is not limited to this. It may also be possible for the information processing apparatus 110 to include the function of the image generation apparatus 120, the function of the user terminal 140, or the functions of both the image generation apparatus 120 and the user terminal 140. Further, the image generation apparatus 120 may include the function of the user terminal 140.

<Hardware Configuration of Each Apparatus>

The hardware configuration of the information processing apparatus 110, the image generation apparatus 120, and the user terminal 140 is explained by using diagrams. FIG. 2 is a diagram showing a hardware configuration example of the information processing apparatus 110, the image generation apparatus 120, and the user terminal 140. The information processing apparatus 110, the image generation apparatus 120, and the user terminal 140 have a common hardware configuration and have a CPU 211, a ROM 212, a RAM 213, an auxiliary storage device 214, a display unit 215, an operation unit 216, a communication unit 217, and a bus 218.

The CPU 211 implements each function of the information processing apparatus 110 and the image generation apparatus 120 shown in FIG. 1B by controlling the entire image processing system using computer programs and data stored in the ROM 212 and the RAM 213. It may also be possible for the information processing apparatus 110 and the image generation apparatus 120 to have one piece or a plurality of pieces of dedicated hardware different from the CPU 211 and for the dedicated hardware to perform at least part of the processing of the CPU 211. As examples of the dedicated hardware, there are an ASIC (Application Specific Integrated Circuit), an FPGA (Field Programmable Gate Array), a DSP (Digital Signal Processor) and the like. The ROM 212 stores programs and the like that do not need to be changed. The RAM 213 temporarily stores programs and data supplied from the auxiliary storage device 214, data supplied from the outside via the communication unit 217, and the like. The auxiliary storage device 214 includes, for example, a hard disk drive and the like and stores various kinds of data, such as image data and voice data.

The display unit 215 includes, for example, a liquid crystal display, an LED and the like and displays a GUI (Graphical User Interface) for a user to operate the information processing apparatus 110, and the like. The operation unit 216 includes, for example, a keyboard, a mouse, a joystick, a touch panel and the like and receives the operation by a user and inputs various instructions to the CPU 211. The CPU 211 operates as a display control unit configured to control the display unit 215 and an operation control unit configured to control the operation unit 216.

The communication unit 217 is used for communication with external devices of the information processing apparatus 110, the image generation apparatus 120, and the user terminal 140. For example, in a case where the information processing apparatus 110, the image generation apparatus 120, and the user terminal 140 are connected with an external device by a wire, a communication cable is connected to the communication unit 217. In a case where the information processing apparatus 110, the image generation apparatus 120, and the user terminal 140 have a function to wirelessly communicate with an external device, the communication unit 217 comprises an antenna. The bus 218 connects each unit of the information processing apparatus 110, the image generation apparatus 120, and the user terminal 140 and transmits information.

In the present embodiment, although the display unit 215 and the operation unit 216 exist inside the information processing apparatus 110, at least one of the display unit 215 and the operation unit 216 may exist as another device outside the information processing apparatus 110. The display unit 215 and the operation unit 216 may be integrated into one unit.

<Generation of Virtual Advertisement-Added Virtual Viewpoint Image>

Figure 3A:
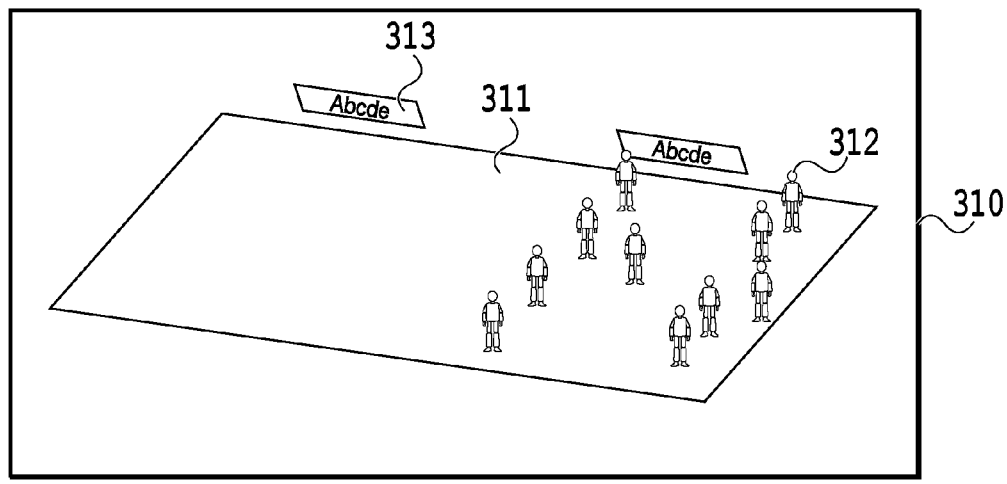
FIG. 3A to FIG. 3C are each a diagram explaining generation of a virtual advertisement-added virtual viewpoint image.
Figure 3B:
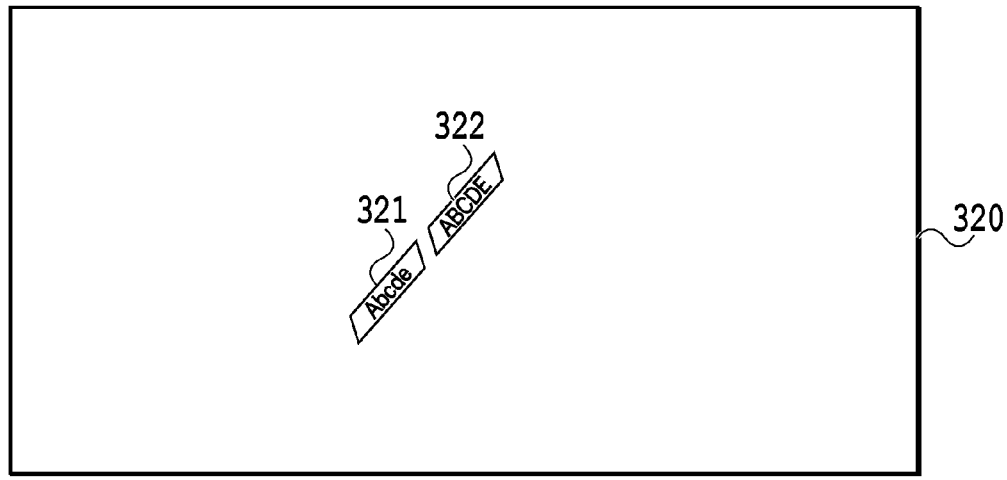
Figure 3C:
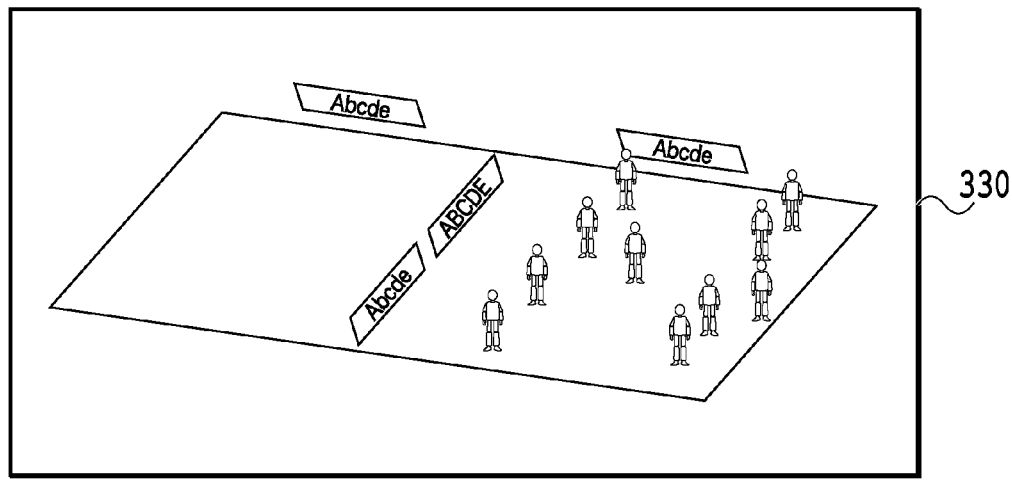

The generation of a virtual advertisement-added virtual viewpoint image in accordance with a virtual viewpoint based on 3D data (three-dimensional data) is explained by using diagrams. FIG. 3A to FIG. 3C are each a diagram explaining the generation of a virtual advertisement-added virtual viewpoint image in accordance with a virtual viewpoint based on 3D data corresponding to an image (video) of a game of soccer. FIG. 3A shows a virtual viewpoint image example generated in accordance with a virtual viewpoint based on basic 3D data. FIG. 3B shows an image example of virtual advertisement data in accordance with the virtual viewpoint of the virtual viewpoint image in FIG. 3A. FIG. 3C shows a virtual advertisement-added virtual viewpoint image example obtained by combining the virtual viewpoint image in FIG. 3A and the virtual advertisement data in FIG. 3B.

A virtual viewpoint image 310 shown in FIG. 3A is an image in a case where an object that exists actually is viewed from an arbitrary viewpoint (virtual viewpoint) and includes a field 311, players 312 existing on the field, and advertisement signboards 313 installed on the side of the field 311. The virtual viewpoint image 310 is an image that is generated in accordance with a virtual viewpoint based on basic 3D data stored in advance in the basic data storage unit 129. The basic 3D data is, for example, shape data indicating the shape of an object, which is generated by a publicly known technique based on a plurality of captured images obtained by capturing a target area from different viewpoints with a plurality of imaging apparatuses. The publicly known technique is, for example, the shape-from-silhouette method and the like.

A virtual advertisement data image 320 shown in FIG. 3B is a virtual advertisement image that can be displayed in an area that does not overlap the object in the virtual viewpoint image 310, which is the target of interest of a viewer, such as the players 312 and the advertisement signboards 313 existing in the virtual viewpoint image 310. That is, the virtual advertisement data image 320 includes two signboards 321 and 322 arranged side by side along the halfway line of the field 311 in the virtual viewpoint image 310. The signboard 321 is a virtual advertisement image in which a texture "Abcde" is described centered. The signboard 322 is a virtual advertisement image in which a texture "ABCDE" is described centered.

A virtual advertisement-added virtual viewpoint image 330 shown in FIG. 3C is an image generated by the rendering unit 132 in accordance with the virtual viewpoint based on the combined 3D data obtained by the combination unit 131 combining the basic 3D data and the virtual advertisement data. Consequently, by preparing in advance virtual advertisement data desired to be displayed in a virtual viewpoint image, it is made possible to generate a virtual advertisement-added virtual viewpoint image in which an advertisement signboard seems to exist in the vicinity of the halfway line of the field at which the advertisement signboard cannot exist actually.

<Operation of Image Processing System>

Figure 4A:
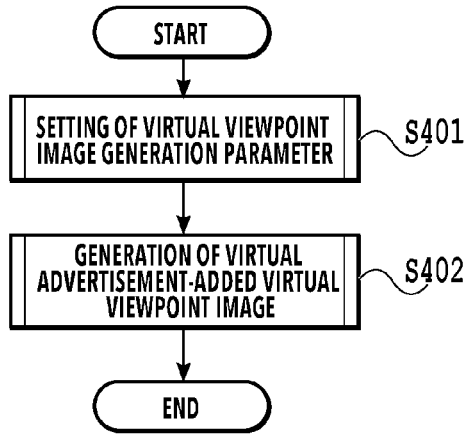
FIG. 4A to FIG. 4C are each a flowchart showing a flow of processing performed by the image processing system.
Figure 4B:
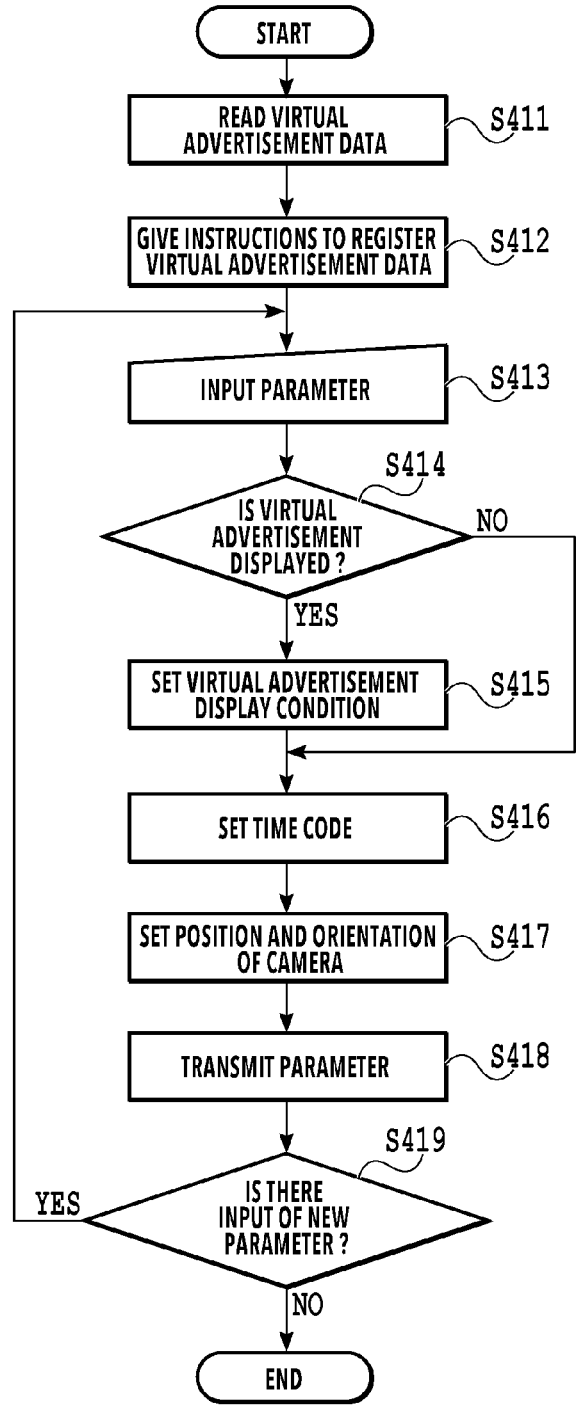
Figure 4C:
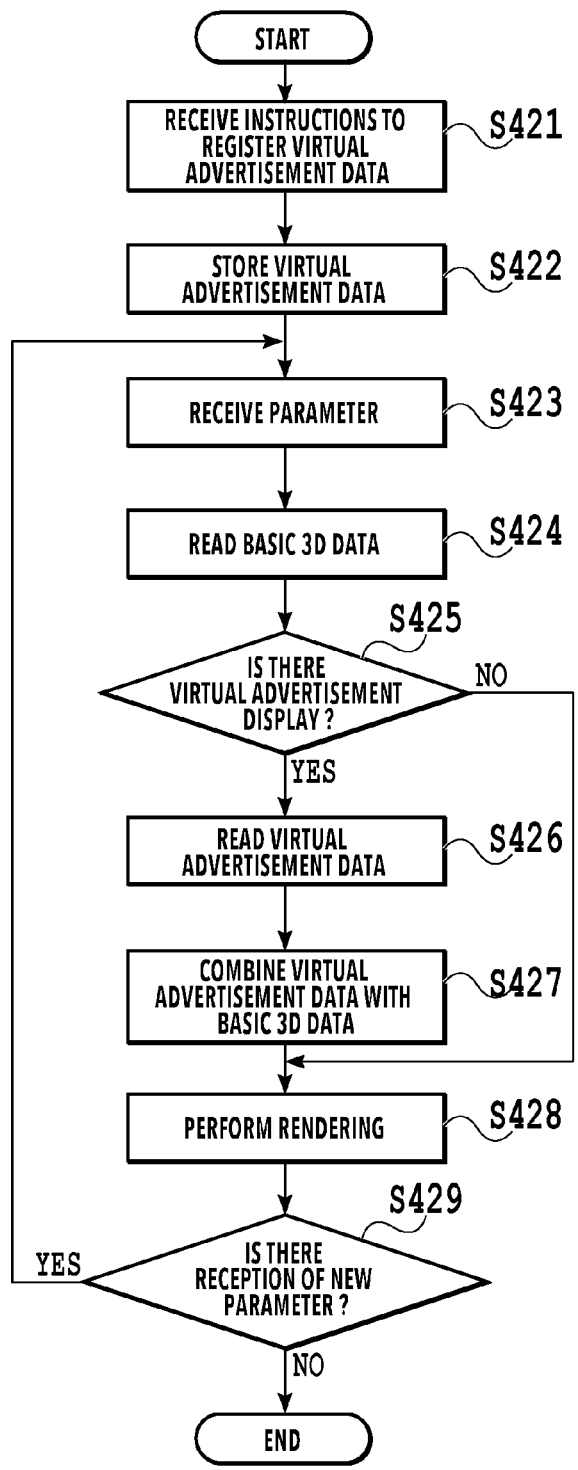

Following the above, a flow of processing performed by the image processing system is explained by using diagrams. FIG. 4A to FIG. 4C are each a flowchart showing a flow of processing performed by the image processing system. FIG. 4A shows a flow of processing performed by the image processing system, FIG. 4B shows a detailed flow of processing to set a virtual viewpoint image generation parameter, and FIG. 4C shows a detailed flow of processing to generate a virtual advertisement-added virtual viewpoint image. The processing shown in FIG. 4A to FIG. 4C is performed by the CPU 211 reading computer programs stored in the ROM 212 or the auxiliary storage device 214 and executing the programs. In the following, in explanation of FIG. 4A to FIG. 4C, a processing step is simply described as S.

As shown in FIG. 4A, at S401, the information processing apparatus 110 of the image processing system receives a user operation and sets various kinds of information to a parameter in accordance with the received operation contents. A detailed flow of setting processing will be described later by using diagrams. The parameter to which various kinds of information are set is transmitted to the image generation apparatus 120 of the image processing system.

At S402, the image generation apparatus 120 of the image processing system generates a virtual advertisement-added virtual viewpoint image in accordance with the various kinds of information set to the parameter. That is, the image generation apparatus 120 generates a virtual advertisement-added virtual viewpoint image in accordance with the virtual viewpoint information set to the parameter based on the combined 3D data obtained by combining the basic 3D data corresponding to the time code set to the parameter and the virtual advertisement data indicated by the identification information. A detailed flow of generation processing will be described later by using diagrams. The generated virtual advertisement-added virtual viewpoint image is sent to the display that is the display unit 215 of the image generation apparatus 120, the user terminal 140 connected to the image generation apparatus 120, and the like.

Following the above, a detailed flow of setting processing of a virtual viewpoint image generation parameter is explained by using diagrams. As shown in FIG. 4B, at S411, the virtual advertisement setting unit 112 reads the virtual advertisement data that is created in advance. The virtual advertisement data may be read from a virtual advertisement database, not shown schematically, connected to the information processing apparatus 110, or a USB memory connected to the information processing apparatus 110. The read virtual advertisement data is sent to the registration instruction unit 113 and the display condition setting unit 115.

At S412, the registration instruction unit 113 transmits the target virtual advertisement data to the image generation apparatus 120 along with the information on instructions to register the virtual advertisement data read by the virtual advertisement setting unit 112 in the virtual advertisement storage unit 122 of the image generation apparatus 120.

At S413, the operation reception unit 111 receives a user operation for inputting a virtual viewpoint image generation parameter.

At S414, the operation reception unit 111 determines whether or not there are instructions to display a virtual advertisement in the information that is generated in accordance with the input operation received by the operation reception unit 111 at S413. In a case where determination results that there are instructions to display a virtual advertisement in the information that is generated in accordance with the input operation are obtained (YES at S414), the processing moves to S415. On the other hand, in a case where determination results that there are not instructions to display a virtual advertisement in the information that is generated in accordance with the input operation are obtained (NO at S414), the processing skips S415 and moves to S416.

At S415, the display condition setting unit 115 sets a display condition of selection-target virtual advertisement data and identification information on the selection-target virtual advertisement to the parameter that is transmitted to the image generation apparatus 120 based on the information that is generated in accordance with the input operation received by the operation reception unit 111 at S413.

At S416, the time code setting unit 116 sets a time code to the parameter that is transmitted to the image generation apparatus 120 based on the information that is generated in accordance with the input operation received by the operation reception unit 111 at S413.

At S417, the virtual viewpoint setting unit 117 sets virtual viewpoint information to the parameter that is transmitted to the image generation apparatus 120 based on the information that is generated in accordance with the input operation received by the operation reception unit 111 at S413. The virtual viewpoint information includes the position of the virtual camera, the orientation of the virtual camera, and the angle of view corresponding to the virtual camera.

At S418, the parameter transmission unit 118 transmits the parameter to which various kinds of information generated in the processing at S415 to S417 are set to the parameter reception unit 123 of the image generation apparatus 120.

At S419, the information processing apparatus 110 determines whether there is an input of a new parameter. In a case where determination results that there is an input of a new parameter are obtained (YES at S419), the processing returns to S413 and the series of processing at S413 to S418 is performed for the input new parameter. On the other hand, in a case where determination results that there is not an input of a new parameter are obtained (NO at S419), the flow shown in FIG. 4B is terminated.

Following the above, a detailed flow of generation processing of a virtual advertisement-added virtual viewpoint image is explained by using diagrams. As shown in FIG. 4C, at S421, the registration reception unit 121 receives the target virtual advertisement data along with instructions information transmitted from the registration instruction unit 113 of the information processing apparatus 110.

At S422, the virtual advertisement storage unit 122 stores the virtual advertisement data received by the registration reception unit 121 at S421. Due to this, the virtual advertisement data is registered in the image generation apparatus 120.

At S423, the parameter reception unit 123 receives the parameter transmitted by the parameter transmission unit 118 at S418.

At S424, the basic data reading unit 130 reads the basic 3D data relevant (corresponding) to the time code extracted from the parameter by the time code extraction unit 126 of the parameter extraction unit 124 from the basic data storage unit 129. The parameter from which the time code is extracted is the parameter received by the parameter reception unit 123 at S423.

At S425, the display condition extraction unit 125 of the parameter extraction unit 124 determines whether or not the information relating to the display condition of virtual advertisement data is included in the parameter received by the parameter reception unit 123 at S423. In a case where determination results that the information relating to the display condition of virtual advertisement data is included in the parameter are obtained (YES at S425), the processing moves to S426. On the other hand, in a case where determination results that the information relating to the display condition of virtual advertisement data is not included in the parameter are obtained (NO at S425), the processing skips S426 and S427 and moves to S428.

At S426, the virtual advertisement reading unit 128 reads the virtual advertisement data corresponding to the identification information extracted from the parameter by the display condition extraction unit 125 from the virtual advertisement storage unit 122. The parameter from which the identification information is extracted is the parameter received by the parameter reception unit 123 at S423.

At S427, the combination unit 131 generates combined 3D data by combining the basic 3D data read by the basic data reading unit 130 at S424 and the virtual advertisement data read by the virtual advertisement reading unit 128 at S426.

At S428, the rendering unit 132 performs rendering processing for the combined 3D data generated at S427 or the basic 3D data read at S424 in accordance with the virtual viewpoint information extracted from the parameter by the virtual viewpoint extraction unit 127. By this processing, a virtual advertisement-added virtual viewpoint image or a virtual viewpoint image with no virtual advertisement is generated. The virtual advertisement-added virtual viewpoint image or the virtual viewpoint image with no virtual advertisement that is generated is sent to the user terminal 140 and the like outside the image generation apparatus 120 as an image signal. The parameter from which the virtual viewpoint information is extracted is the parameter received by the parameter reception unit 123 at S423.

At S429, the image generation apparatus 120 determines whether or not there is reception of a new parameter. In a case where determination results that there is reception of a new parameter are obtained (YES at S429), the processing returns to S423 and the series of processing at S423 to S428 is performed for the received new parameter. On the other hand, in a case where determination results that there is not reception of a new parameter are obtained (NO at S429), the flow shown in FIG. 4C is terminated.

In the flows in FIG. 4A and FIG. 4B, although the parameter setting processing including the reading and registration of virtual advertisement data is explained, the parameter setting processing is not limited to this. That is, it may also be possible to perform the parameter setting processing including the setting of a virtual advertisement display condition by performing in advance the reading and registration of virtual advertisement data.

Further, in the flows in FIG. 4A and FIG. 4C, although the virtual viewpoint image generation processing including the reception and storage of instructions to register virtual advertisement data is explained, the generation processing is not limited to this. That is, it may also be possible to perform the generation processing of a virtual advertisement-added virtual viewpoint image by performing in advance the reception and storage of instructions to register virtual advertisement data.

<Flow of Processing Between Apparatuses of Image Processing System>

Figure 5:
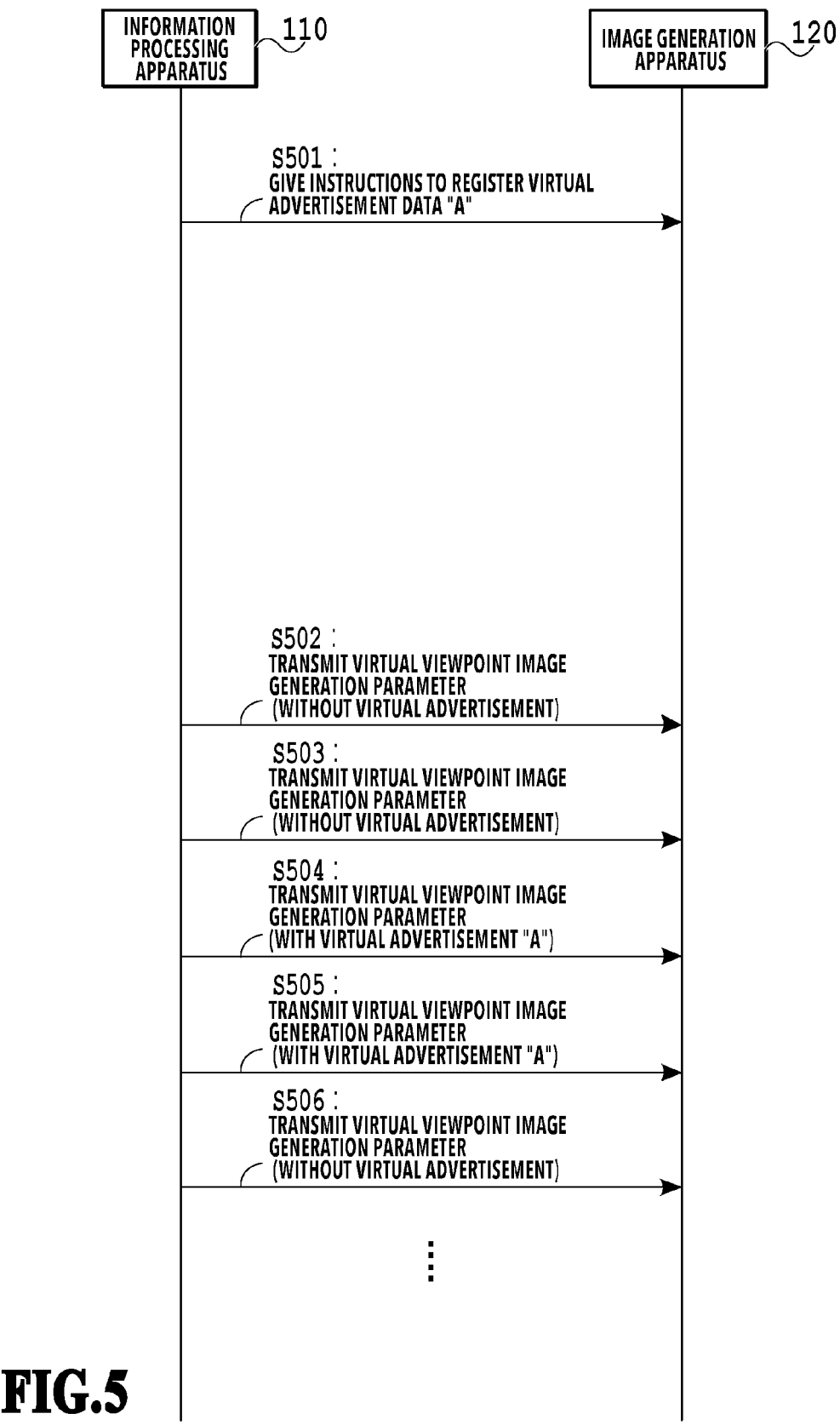
FIG. 5 is a sequence diagram showing a flow of processing between an information processing apparatus and an image generation apparatus.

A flow of processing between the apparatuses of the image processing system is explained by using diagrams. FIG. 5 is a sequence diagram showing a flow of processing between the information processing apparatus 110 and the image generation apparatus 120 in the image processing system. In the following, in the explanation of FIG. 5 and FIG. 10, to be described later, the processing sequence is simply described as S.

At S501, the information processing apparatus 110 (registration instruction unit 113) instructs the image generation apparatus 120 to register virtual advertisement data "A" set by the virtual advertisement setting unit 112. To S501, the processing at S412 in the flowchart in FIG. 4B and the processing at S421 in the flowchart in FIG. 4C correspond. Here, a virtual advertisement data example is explained by using diagrams. FIG. 6A to FIG. 6C are each a diagram showing a virtual advertisement data registration example and a virtual viewpoint image generation parameter example and FIG. 6A shows a 3D model format example of virtual advertisement data that is transmitted at the time of registration. As shown in FIG. 6A, in the 3D model format of virtual advertisement data, a file name and a file size of each of an obj file, an mtl file, and a png file are designated. In the obj file, information on the vertex, the normal and the like of the 3D model (three-dimensional model) of a virtual advertisement is stored. In the mtl (material) file, color information and texture information on the 3D model of a virtual advertisement are stored. In the png file, parameters of the 3D model of a virtual advertisement are stored.

Here, the obj file is explained by using diagrams. FIG. 7 is a diagram showing an example of the obj file that is designated in the 3D model format of virtual advertisement data. In the obj file, the vertex coordinate values are designated by a keyword "v", the texture coordinate values are designated by a keyword "vt", and a normal vector is designated by a keyword "vn", respectively. Further, in the present embodiment, although the obj file is explained as an example of the file format representing information on the position, size, and orientation of the 3D model of virtual advertisement data, the file format is not limited to this. The file format may be another format as long as the position, size, and orientation of the 3D model of virtual advertisement data can be represented.

Explanation is returned to FIG. 5. At S502, the information processing apparatus 110 (parameter transmission unit 118) transmits a virtual viewpoint image generation parameter (without virtual advertisement) without virtual advertisement display instructions, which is set by the parameter setting unit 114, to the image generation apparatus 120. Here, a virtual viewpoint image generation parameter (without virtual advertisement) data example is explained by using diagrams. FIG. 6B is a diagram showing a format example of virtual viewpoint image generation parameter (without virtual advertisement) data (in the following, also referred to as parameter (without virtual advertisement) data). In the format of the parameter (without virtual advertisement) data, the position of the virtual camera is designated by "rotation quaternion" and the orientation of the virtual camera is designated by "translation vector", respectively. In the format of the parameter (without virtual advertisement) data, further, information representing the angle of view corresponding to the virtual camera is designated by "horizontal angle" and the time code is designated by "time code", respectively. That is, in the format of the parameter (without virtual advertisement) data shown in FIG. 6B, although the virtual viewpoint information is designated, information relating to a virtual advertisement is not designated.

At S503, as at S502, the information processing apparatus 110 transmits the parameter (without virtual advertisement) without virtual advertisement display instructions, which is set by the parameter setting unit 114, to the image generation apparatus 120.

Here, an example of a virtual viewpoint image is explained by using diagrams, which is generated in accordance with virtual viewpoint information by the image generation apparatus 120 extracting the virtual viewpoint information from the parameter (without virtual advertisement) at S502 and S503. In a case where the rendering unit 132 performs rendering processing for the basic 3D data in accordance with the virtual viewpoint information extracted from the parameter (without virtual advertisement), the virtual viewpoint image to which no virtual advertisement is added as shown in FIG. 3A is generated. Note that the time code that is extracted from the parameter (without virtual advertisement) received at S503 is different from the time code that is extracted from the parameter (without virtual advertisement) received at S502. That is, the target frame of the parameter received at S503 is different from that of the parameter received at S502.

At S504, the information processing apparatus 110 (parameter transmission unit 118) transmits a virtual viewpoint image generation parameter (with virtual advertisement "A") with virtual advertisement display instructions, which is set by the parameter setting unit 114, to the image generation apparatus 120. Here, a virtual viewpoint image generation parameter (with virtual advertisement "A") data example is explained by using diagrams. FIG. 6C is a diagram showing a format example of the virtual viewpoint image generation parameter (with virtual advertisement "A") data (in the following, also referred to as parameter (with virtual advertisement "A" data)). In the format of the parameter (with virtual advertisement "A") data, the information representing the position of the virtual camera, the orientation of the virtual camera, and the angle of view corresponding to the virtual camera, and the time code are designated, which are also designated in the parameter (without virtual advertisement) shown in FIG. 6B. In the format of the parameter (with virtual advertisement "A") data, information relating to virtual advertisement (in FIG. 6C, virtual advertisement "A") display instructions is further designated. This parameter (with virtual advertisement "A")

includes instructions to display the virtual advertisement "A" (["advertise ID": "A"] in FIG. 6A) that is instructed to be registered in the processing at S501 in the virtual viewpoint image. Upon receipt of the parameter (with virtual advertisement "A") data such as this, the image generation apparatus 120 generates a virtual viewpoint image in which the virtual advertisement is displayed. Note that, the time code that is extracted from the parameter received at S504 is different from the time code that is extracted from the parameter received at S502 to S503. That is, the target frames of the parameters received at S502 to S504 are different from one another.

At S505, as at S504, the information processing apparatus 110 transmits the parameter (with virtual advertisement "A") with virtual advertisement display instructions, which is set by the parameter setting unit 114, to the image generation apparatus 120.

Here, an example of a virtual advertisement-added virtual viewpoint image is explained by using diagrams, which is generated in accordance with virtual viewpoint information by the image generation apparatus 120 extracting the virtual viewpoint information from the parameter (with virtual advertisement "A") at S504 and S505. In accordance with the virtual viewpoint information that is extracted from the parameter (with virtual advertisement "A"), the rendering unit 132 performs rendering processing for the combined 3D data obtained by combining the basic 3D data and the virtual advertisement data. Due to this processing, the virtual viewpoint image to which the virtual advertisement is added as shown in FIG. 3C is generated. Note that the time code that is extracted from the parameter (with virtual advertisement "A") received at S505 is different from the time code that is extracted from the parameters received at S502 to S504. That is, the target frame of the parameter (with virtual advertisement "A") received at S505 is different from the target frame of the parameters received at S502 to S504.

At S506, as at S502 and S503, the information processing apparatus 110 transmits again the parameter (without virtual advertisement) without virtual advertisement display instructions, which is set by the parameter setting unit 114, to the image generation apparatus 120. In the image generation apparatus 120, in a case where the rendering unit 132 performs rendering processing for the basic 3D data in accordance with the virtual viewpoint information that is extracted from the parameter (without virtual advertisement), a virtual viewpoint image to which no virtual advertisement is added is generated again. Note that the time code that is extracted from the parameter (without virtual advertisement) received at S506 is different from the time code that is extracted from the parameters received at S502 to S505. That is, the target frame of the parameter (without virtual advertisement) received at S506 is different from that of the parameters received at S502 to S505.

As above, as explained using FIG. 5, it is possible to perform setting so that a desired virtual advertisement is added to (displayed at) a desired position in a desired virtual viewpoint image or setting so that no virtual advertisement is added (displayed) for each frame.

<Virtual Advertisement Display Condition Setting UI>

Figure 8A:
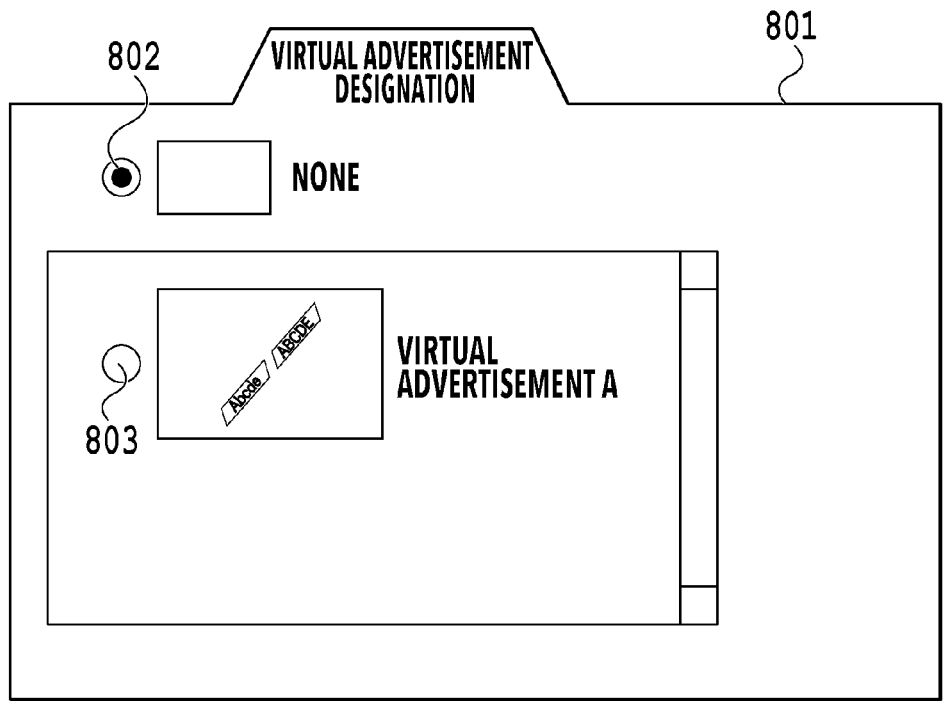
FIG. 8A and FIG. 8B are each a diagram showing a user interface example.
Figure 8B:
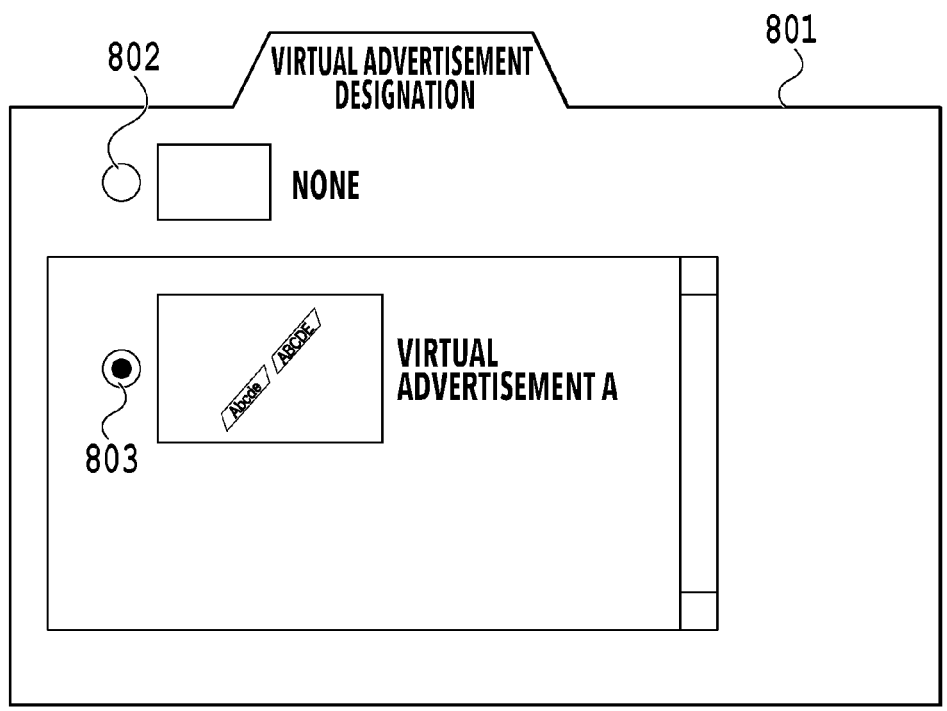

An example of a user interface (UI) for setting a condition of displaying a virtual advertisement in a virtual viewpoint image is explained by using diagrams. FIG. 8A and FIG. 8B are each a diagram showing a virtual advertisement display condition setting UI example and FIG. 8A shows a case where nondisplay of a virtual advertisement is set and FIG. 8B shows a case where display of a virtual advertisement is set. In a case where a virtual advertisement display condition is set by a user operation on the virtual advertisement display condition setting UI, information on the virtual advertisement display condition is set to a parameter by the display condition setting unit 115

A virtual advertisement display condition setting UI 801 includes two radio buttons 802 and 803. The radio button 802 is a button for setting nondisplay of a virtual advertisement, that is, no virtual advertisement is displayed in a virtual viewpoint image. The radio button 803 is a button for designating a display-target virtual advertisement, which is an additional display of a virtual advertisement, for a virtual viewpoint image. The ratio button 803 is arranged within a list box displaying a plurality of registered virtual advertisements in a list.

In a case where it is desired not to display a virtual advertisement in a virtual viewpoint image, as shown in FIG. 8A, the radio button 802 corresponding to "None" for setting nondisplay of a virtual advertisement by the user operation is selected. To the selection of the radio button 802 such as this, the processing sequences at S502, S503, and S506 in the sequence diagram in FIG. 5 correspond.

On the other hand, in a case where it is desired to display a virtual advertisement in a virtual viewpoint image, as shown in FIG. 8B, the radio button 803 corresponding to the virtual advertisement ("virtual advertisement A") desired to be displayed is selected in order to set display of the virtual advertisement by the user operation at timing at which the virtual advertisement is desired to be displayed. To the selection of the radio button 803 such as this, the processing sequences at S504 and S505 in the sequence diagram in FIG. 5 correspond.

<User Operation Screen>

Figure 9A:
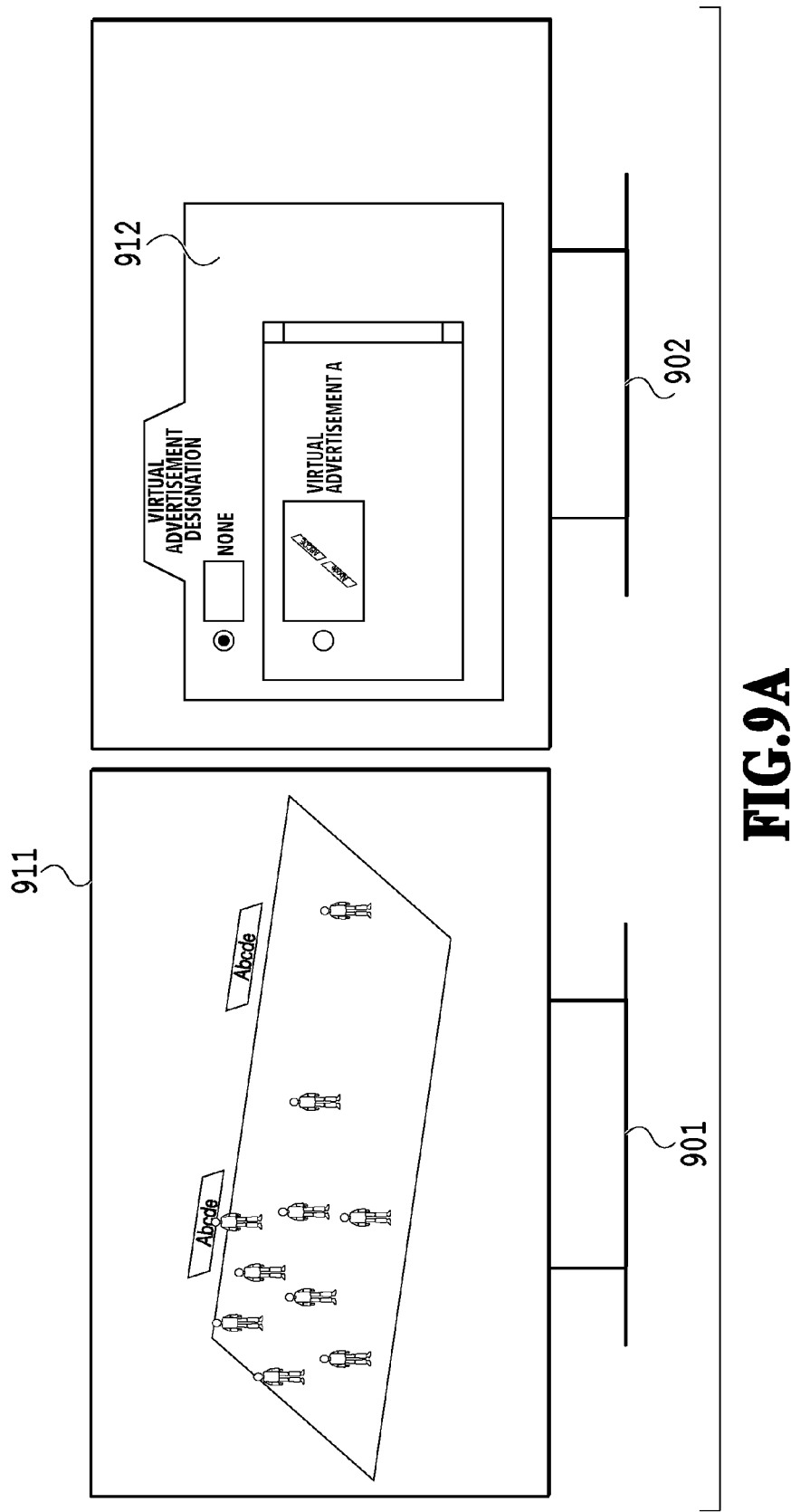
FIG. 9A and FIG. 9B are each a diagram showing a user operation screen example.
Figure 9B:
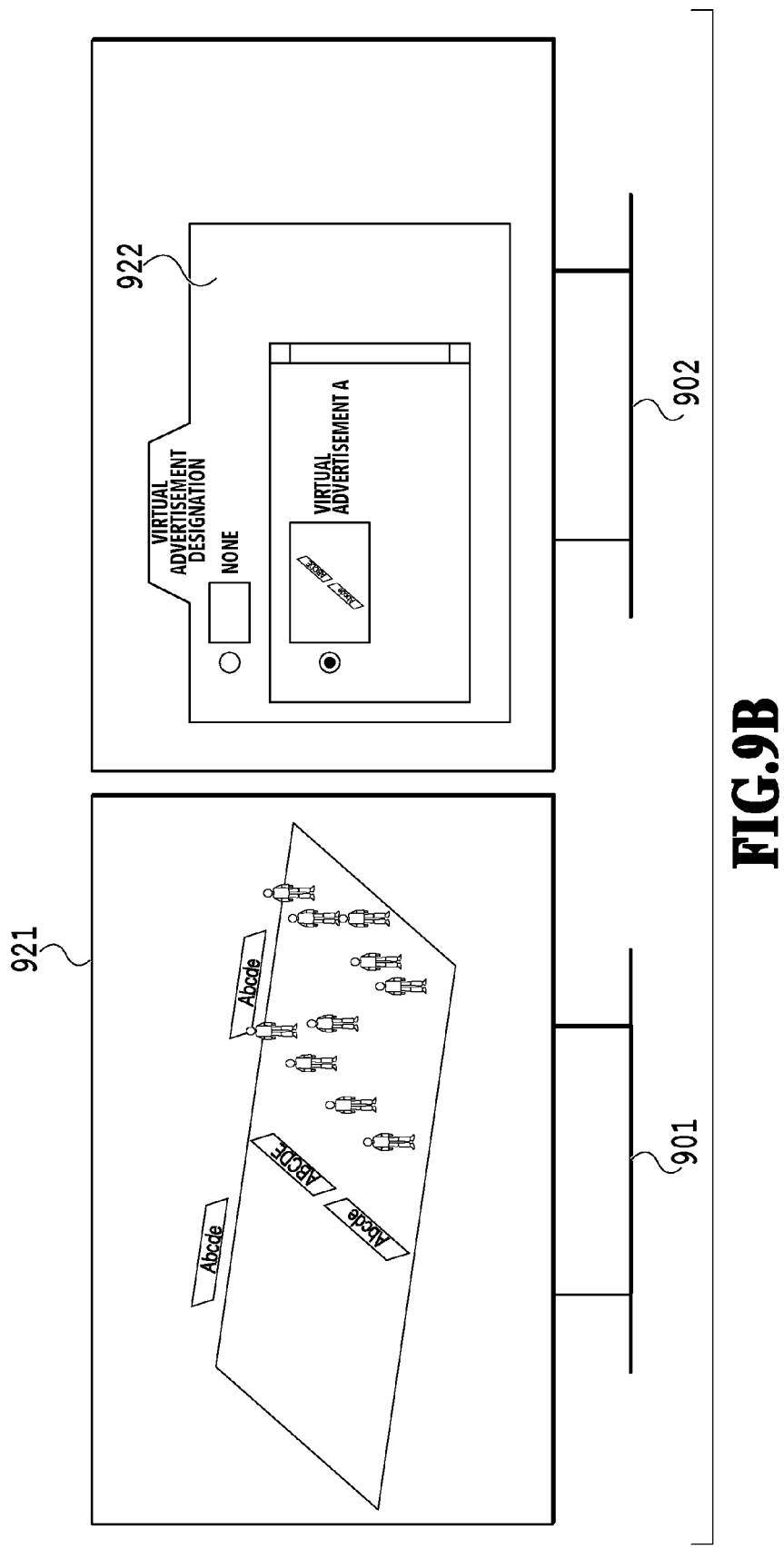

Here, a user operation screen for setting a virtual viewpoint corresponding to a virtual viewpoint image and a virtual advertisement display condition is explained by using diagrams. FIG. 9A and FIG. 9B are each a diagram showing a user operation screen example and FIG. 9A shows a case where nondisplay of a virtual advertisement is set and FIG. 9B shows a case where display of a virtual advertisement is set. FIG. 9A and FIG. 9B each show a case where the virtual viewpoint image corresponding to the set display condition is displayed on the display on the left side and the virtual advertisement display condition setting UI is displayed on the display on the right side. The display aspect of the virtual viewpoint image and the virtual advertisement display condition setting UI is not limited to this. It may also be possible to display the virtual viewpoint image and the virtual advertisement display condition setting UI on one display.

As shown in FIG. 9A, a display 901 on the left side displays a virtual viewpoint image 911 generated in accordance with the virtual viewpoint based on the basic 3D data. The virtual viewpoint is set initially and before the reception of the user operation relating to the virtual viewpoint, the virtual viewpoint that is set initially is used as the virtual viewpoint. A display 902 on the right side displays a virtual advertisement display designation UI 912 in the state where the radio button for setting nondisplay of a virtual advertisement to the image displayed on the display 901 on the left side is selected. Nondisplay of a virtual advertisement is selected, and therefore, the display on the left side displays the virtual viewpoint image to which no virtual advertisement is added.

As shown in FIG. 9B, the display 901 on the left side displays a virtual viewpoint image 921 generated in accordance with the virtual viewpoint based on the basic 3D data. The display 902 on the right side displays a virtual advertisement display designation UI 922 in the state where the radio button for setting display of the virtual advertisement A to the image displayed on the display 901 on the left side is selected by the user operation. Display of a virtual advertisement is selected, and therefore, the display on the left side displays the virtual viewpoint image to which the virtual advertisement is added.

As in the virtual viewpoint image 911 displayed on the display 901, in the state where the game is played across the field and the players exist across the field, the radio button corresponding to "None" (nondisplay of virtual advertisement) is selected on the UI 912. Because of this, to the virtual viewpoint image 911 displayed on the display 901 on the left side, no virtual advertisement is added.

As in the virtual viewpoint image 921 displayed on the display 901, at the timing at which the state is brought about where the players gather on one side of the field and no player exists on the other side, the radio button corresponding to the virtual advertisement A is selected on the UI 922. Because of this, to the virtual viewpoint image 921 displayed on the display 901 on the left side, the virtual advertisement is added. By registering the virtual advertisement data in advance and selecting the virtual advertisement at the timing at which the virtual advertisement is desired to be displayed on the UI displayed on the display 902 on the right side while watching the virtual viewpoint image that is displayed on the display 901 on the left side, it is possible to immediately display the virtual advertisement in the virtual viewpoint image.

In the present embodiment, in a case where the radio button corresponding to the virtual advertisement A is selected by the user operation, the parameter setting unit 114 sets the display instructions (display condition) of the virtual advertisement A to the parameter and the parameter transmission unit 118 transmits the parameter to the image generation apparatus 120. Note that the operation method is not limited to this and it may also be possible to press down a key assigned to the keyboard or the operation may be one by a touch panel. Further, it may also be possible to enable adjustment of the virtual viewpoint by the user operation by using the virtual viewpoint image 911 displayed on the display 901 on the left side. In a case where the virtual viewpoint is adjusted (set) by the user operation, the parameter setting unit 114 sets the virtual viewpoint information to the parameter and the parameter transmission unit 118 transmits the parameter to the image generation apparatus 120.

Due to this, for example, in a scene where a penalty kick is played in a game of soccer, the setting is performed in accordance with the camera angle so that the virtual advertisement is displayed in the area in which no player exists on the field and the generation of a virtual advertisement-added virtual viewpoint image in accordance with the setting is enabled. That is, it is made possible to display a virtual advertisement in the area that does not overlap a player existing on the field and in which a signboard cannot be installed within the field As explained above, according to the present embodiment, by registering in advance virtual advertisement data (3D model and texture of stationary image) and setting the identification information on the virtual advertisement data, the virtual advertisement display condition, the virtual viewpoint information, and the time code to the parameter, the following effects are obtained. It is possible to generate a virtual advertisement-added virtual viewpoint image or a virtual viewpoint image with no virtual advertisement in accordance with the information extracted from the parameter. Because of this, it is possible to display an effective virtual advertisement suitable to a scene in a virtual viewpoint image by switching between display and nondisplay of a virtual advertisement in real time for each frame. That is, it is possible to generate a virtual viewpoint image in which a virtual advertisement is displayed at a desired position at desired timing.

Second Embodiment

Figure 10:
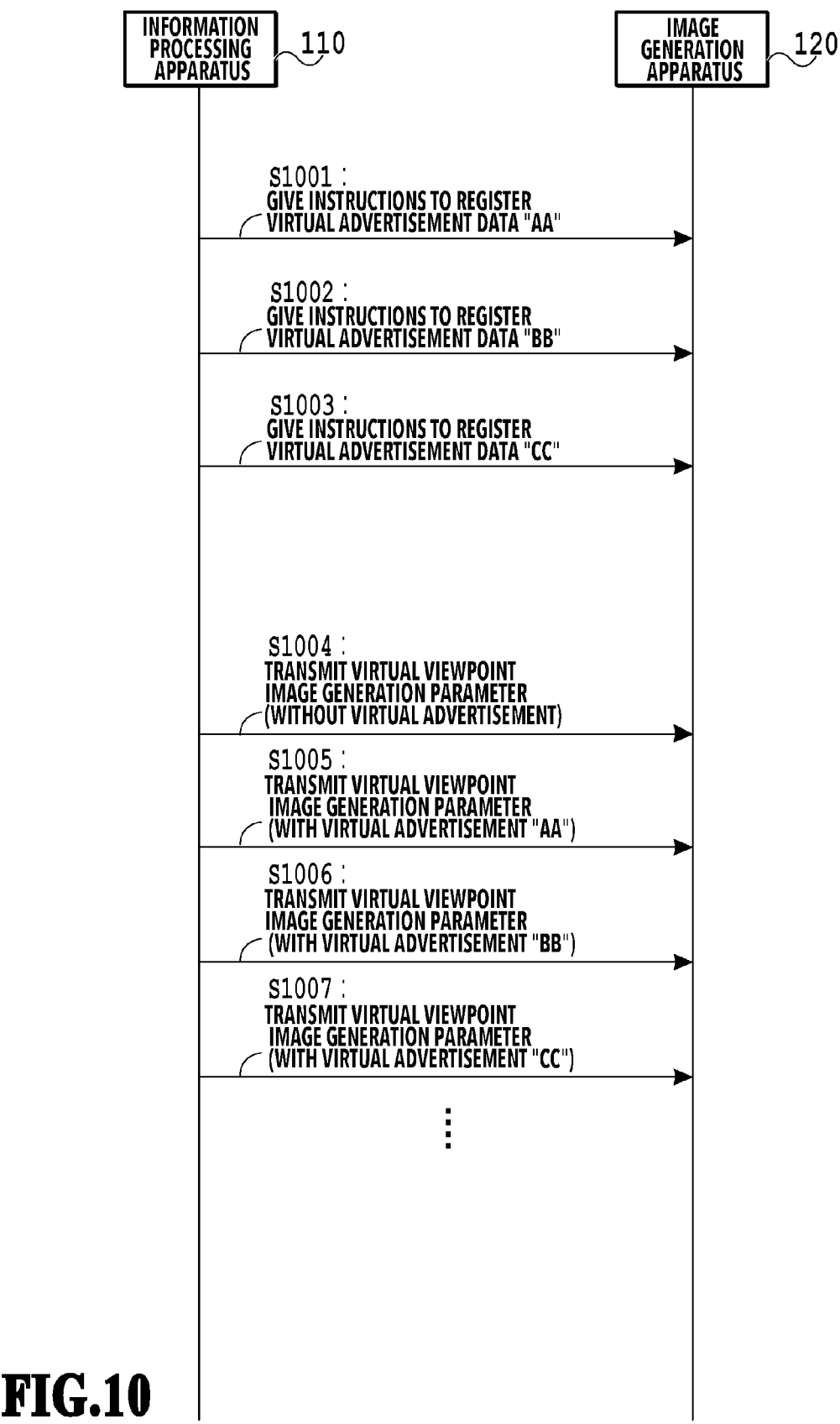
FIG. 10 is a sequence diagram showing a flow of processing between the information processing apparatus and the image generation apparatus.

In the present embodiment, an aspect in which virtual advertisement data is displayed by switching a plurality of kinds of registered virtual advertisement data is explained by using diagrams. FIG. 10 is a sequence diagram showing a flow of processing between the information processing apparatus 110 and the image generation apparatus 120 in a case where a plurality of kinds of virtual advertisement data is registered and the display condition of each of the plurality of kinds of registered virtual advertisement data is set. In the present embodiment, the processing to register a virtual advertisement and set the display condition of the registered virtual advertisement is the same as that of the image processing system of the first embodiment described above, and therefore, its explanation is omitted.

At S1001, the information processing apparatus 110 (registration instruction unit 113) instructs the image generation apparatus 120 to register virtual advertisement data "AA" set by the virtual advertisement setting unit 112. To S1001, the processing at S412 in the flowchart in FIG. 4B and the processing at S421 in the flowchart in FIG. 4C correspond.

Similarly, at S1002, the information processing apparatus 110 instructs the image generation apparatus 120 to register virtual advertisement data "BB" set by the virtual advertisement setting unit 112. At S1003, the information processing apparatus 110 instructs the image generation apparatus 120 to register virtual advertisement data "CC" set by the virtual advertisement setting unit 112.

Figure 11A:
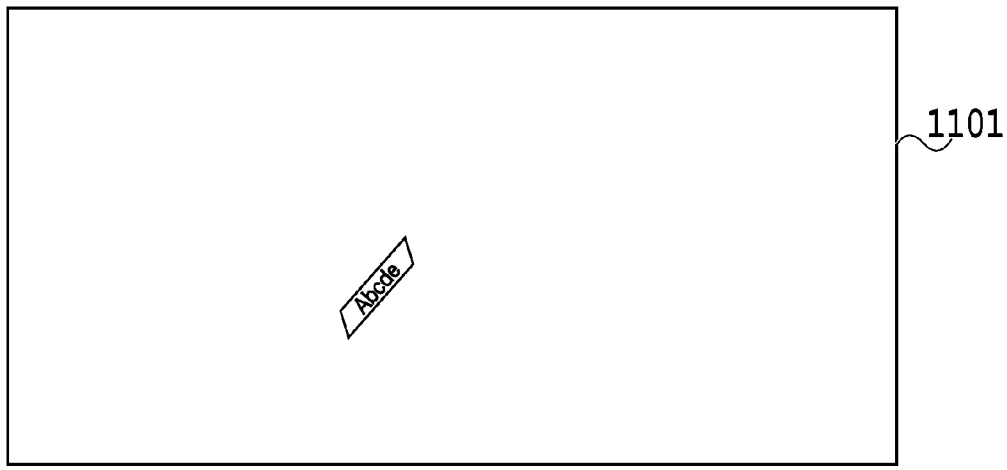
FIG. 11A to FIG. 11C are each a diagram showing an image example of a virtual advertisement that is displayed in a virtual viewpoint image.
Figure 11B:
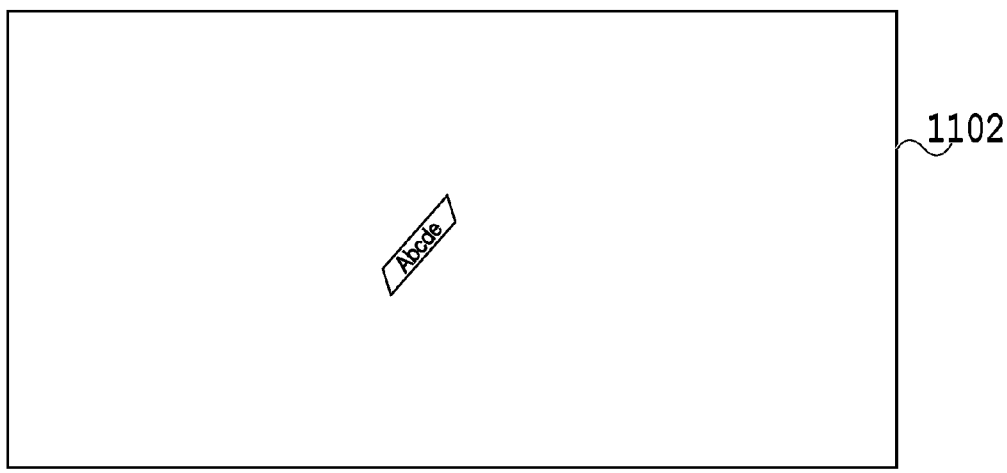
Figure 11C:
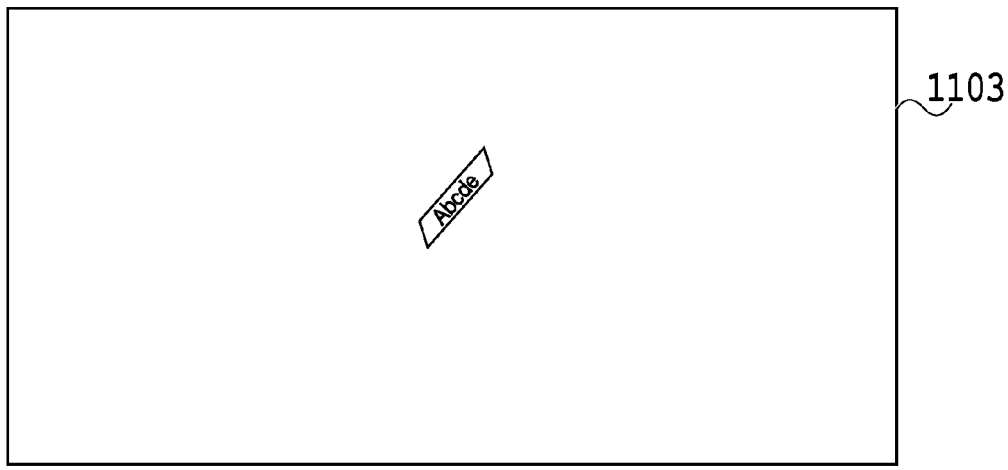

Here, examples of the virtual advertisement data "AA", "BB", and "CC" are explained by using diagrams. FIG. 11A to FIG. 11C are each a diagram showing an image example of the virtual advertisement data displayed in the virtual viewpoint image and FIG. 11A shows an image example of the virtual advertisement data "AA", FIG. 11B shows an image example of the virtual advertisement data "BB", and FIG. 11C shows an image example of the virtual advertisement data "CC". As shown in FIG. 11A to FIG. 11C, although the texture of virtual advertisements 1101, 1102, and 1103 is the same, the display positions of the virtual advertisements are different.

In the above, although the case is explained where the three kinds of data whose display positions of the virtual advertisements are different are registered, the case is not limited to this. That is, it may also be possible to create in advance a plurality of kinds of virtual advertisement data each corresponding to the position at and the size with which the virtual advertisement data is desired to be displayed and having the texture desired to be displayed and register all of them in advance.

At S1004, the information processing apparatus 110 (parameter transmission unit 118) transmits the parameter (without virtual advertisement) without virtual advertisement display instructions, which is set by the parameter setting unit 114, to the image generation apparatus 120.

At S1005, the information processing apparatus 110 (parameter transmission unit 118) transmits the parameter (with virtual advertisement "AA") with virtual advertisement "AA" display instructions, which is set by the parameter setting unit 114, to the image generation apparatus 120.

Similarly, at S1006, the information processing apparatus 110 transmits the parameter (with virtual advertisement "BB") with virtual advertisement "BB" display instructions, which is set by the parameter setting unit 114, to the image generation apparatus 120. Further, at S1007, the information processing apparatus 110 transmits the parameter (with virtual advertisement "CC") with virtual advertisement "CC" display instructions, which is set by the parameter setting unit 114, to the image generation apparatus 120. Note that, each of the time codes extracted from the parameters received at S1004 to S1007 is different from the time code extracted from the parameter received in another processing sequence other than the processing sequence of its own. That is, the target frames of the parameters received at S1004 to S1007 are different from one another.

<Virtual Advertisement Display Setting UI>

Figure 12A:
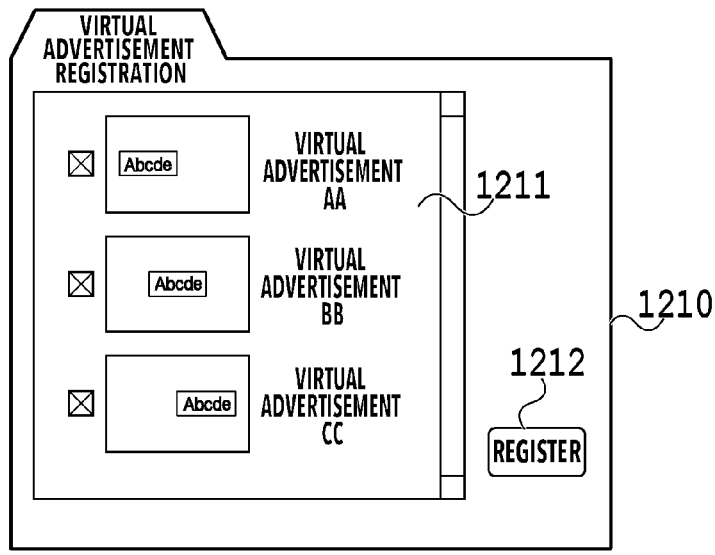
FIG. 12A to FIG. 12C are each a diagram showing a user interface example.
Figure 12B:
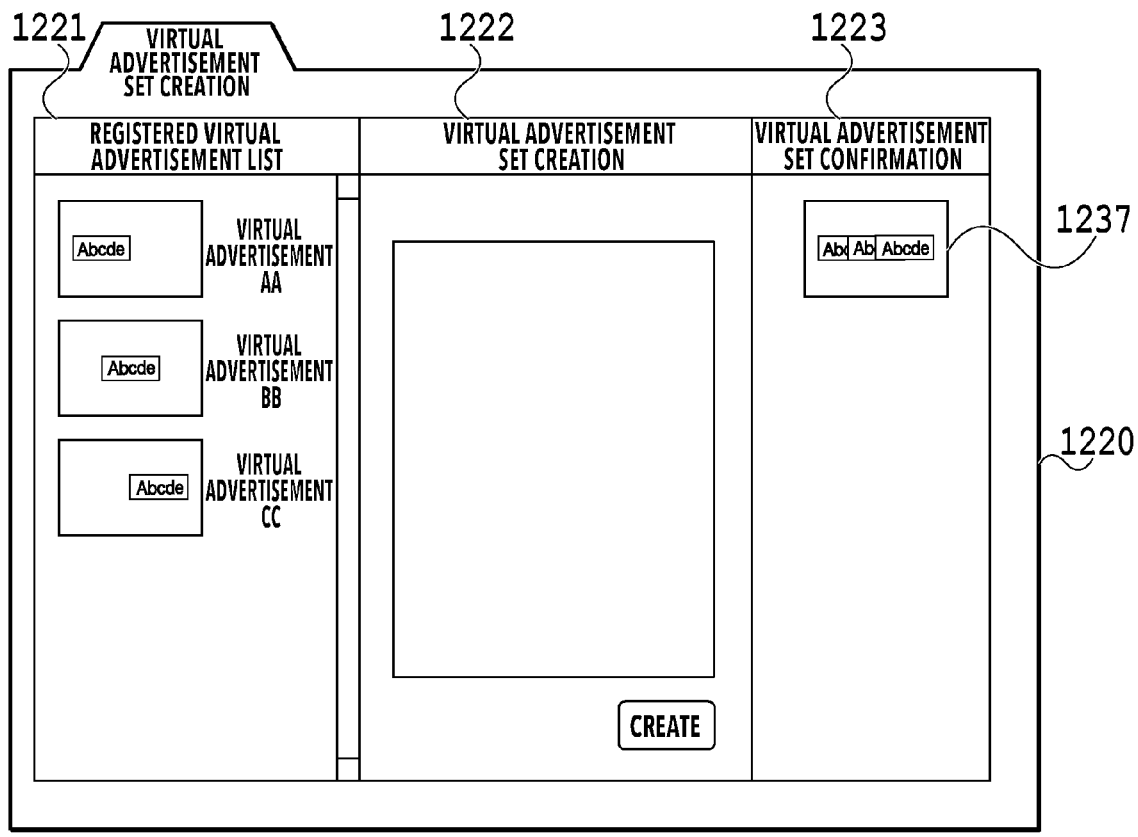
Figure 12C:
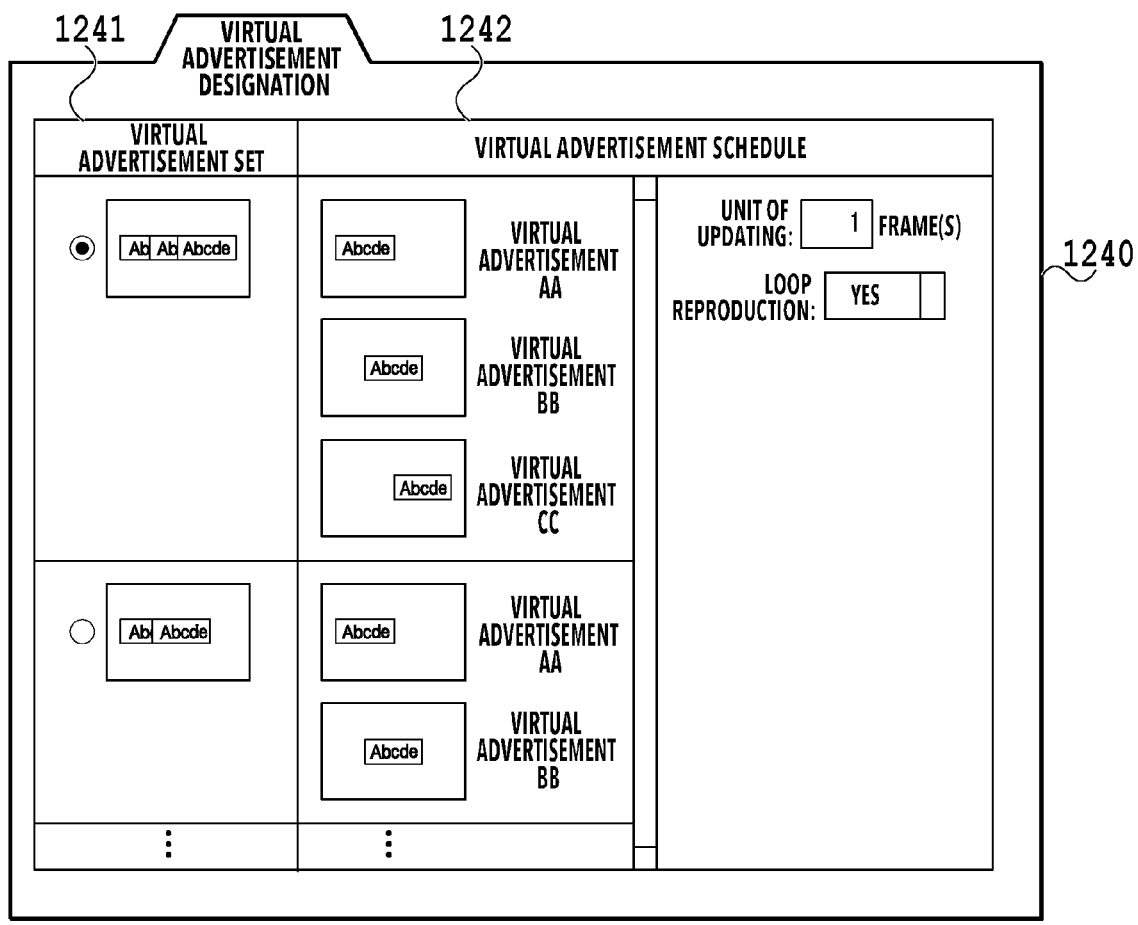

A user interface (UI) example for setting a virtual advertisement display condition for a virtual viewpoint image is explained by using diagrams. FIG. 12A to FIG. 12C are each a diagram showing a virtual advertisement display condition setting UI example. FIG. 12A shows a virtual advertisement registration UI example, FIG. 12B shows a virtual advertisement set creation UI example, and FIG. 12C shows a virtual advertisement schedule setting UI example. In a case where a virtual advertisement is registered by the user operation on the virtual advertisement registration UI, the virtual advertisement data is registered in the image generation apparatus 120 by the virtual advertisement setting unit 112. In a case where a virtual advertisement display condition (virtual advertisement set) is created by the user operation on the virtual advertisement set creation UI, the information relating to the virtual advertisement display condition is set to the parameter by the display condition setting unit 115. In a case where a virtual advertisement display condition (virtual advertisement schedule) is set by the user operation on the virtual advertisement schedule setting UI, the information relating to the virtual advertisement display condition is set to the parameter by the display condition setting unit 115.

As shown in FIG. 12A, a Virtual Advertisement Registration UI 1210 is a user interface for registering a virtual advertisement. The Virtual Advertisement Registration UI 1210 has a list box 1211 that displays registration-target virtual advertisements in such a manner that they can be selected and a "Register" button 1212 for registering a selected virtual advertisement. In the list box 1211, a plurality of sets of an image representing a virtual advertisement and the display position thereof, the name of the virtual advertisement, and a radio button for selecting the virtual advertisement is displayed. In the example in FIG. 12A, in the list box 1211, the virtual advertisement AA, the virtual advertisement BB, and the virtual advertisement CC are displayed.

The virtual advertisement AA is data indicating that a virtual advertisement in which the texture "Abcde" is centered is displayed at the position at the center in the vertical direction and on the left side slightly shifted from the center in the horizontal direction in the virtual viewpoint image. The virtual advertisement BB is data indicating that a virtual advertisement in which the texture "Abcde" is centered is displayed at the position at the center in the vertical direction and at the center in the horizontal direction in the virtual viewpoint image. The virtual advertisement CC is data indicating that a virtual advertisement in which the texture "Abcde" is centered is displayed at the position at the center in the vertical direction and on the right side slightly shifted from the center in the horizontal direction in the virtual viewpoint image. By pressing down the "Register" button 1212 in the state where the radio button corresponding to the virtual advertisement desired to be registered, the selected virtual advertisement is registered in the image generation apparatus 120.

As shown in FIG. 12B, a Virtual Advertisement Set Creation UI 1220 has a list box 1221, a creation area 1222, and a confirmation area 1223. In the list box 1221, registered virtual advertisements are displayed in a list. In the creation area 1222, virtual advertisements that can be created as a virtual advertisement set are displayed in a list. In the confirmation area 1223, a created virtual advertisement set is displayed in a list. The example in FIG. 12B shows a state where a virtual advertisement set 1237 that displays in order the virtual advertisement AA, the virtual advertisement BB, and the virtual advertisement CC is registered in the confirmation area 1223.

Figure 13A:
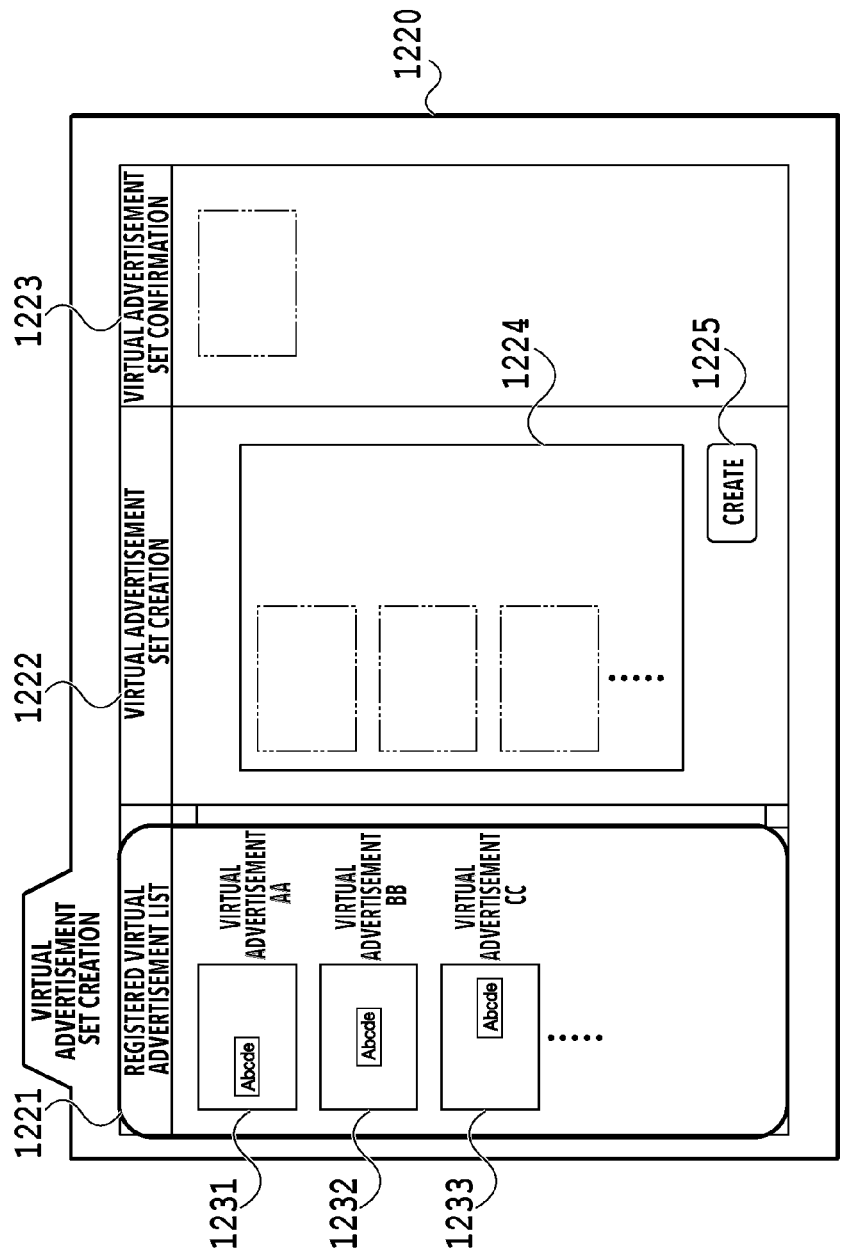
Figure 13B:
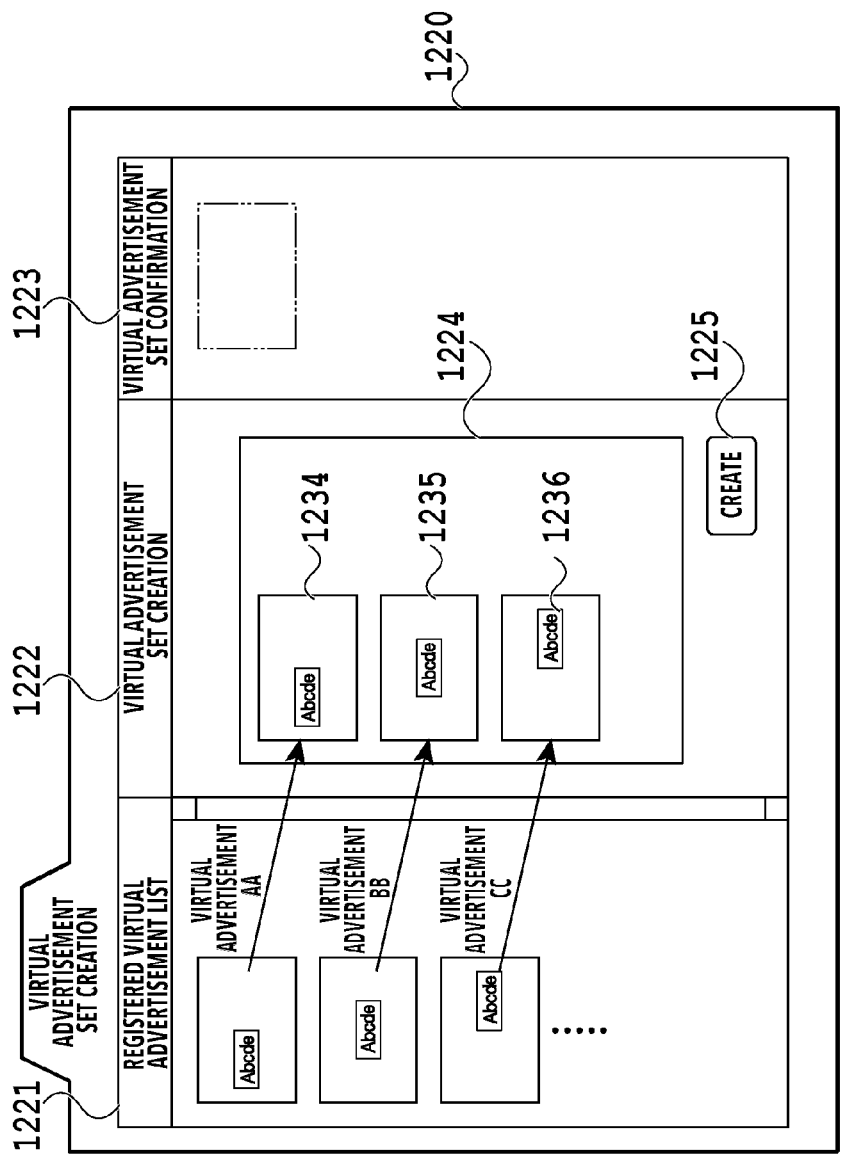

Here, a creation method of a virtual advertisement set is explained by using diagrams. FIG. 13A to FIG. 13C are each a diagram explaining a creation method of a virtual advertisement set. FIG. 13A shows a state where registered virtual advertisements are displayed in a list, FIG. 13B shows a state where a virtual advertisement that is the target of a virtual advertisement set is designated (specified), and FIG. 13C shows a state where a virtual advertisement set is registered.

In a case where a virtual advertisement is registered by the user operation, the virtual advertisement setting unit 112 displays registration-target virtual advertisements in a list in the list box 1221 on the Virtual Advertisement Set Creation UI 1220 as shown in FIG. 13A in accordance with the operation contents of the user operation. In the example in FIG. 13A, a virtual advertisement AA 1231, a virtual advertisement BB 1232, a virtual advertisement CC 1233 and the like are displayed in a list.

Then, in the user operation, by the mouse operation of drag and drop being performed for the virtual advertisement desired to be a virtual advertisement set, the virtual advertisement desired to be a virtual advertisement set is moved from within the list box 1221 into the creation area 1222. In the example in FIG. 13B, as a virtual advertisement set, a virtual advertisement AA 1234, a virtual advertisement BB 1235, and a virtual advertisement CC 1236 are selected.

Then, by a Create button 1225 being pressed down by the user operation, as shown in FIG. 13C, in the confirmation area 1223, the created virtual advertisement set 1237 is displayed. In the example in FIG. 13C, the virtual advertisement set 1237 that displays in order the virtual advertisement AA 1234, the virtual advertisement BB 1235, and the virtual advertisement CC 1236 is confirmed.

Explanation is returned to FIG. 12C. As shown in FIG. 12C, a virtual advertisement schedule setting UI 1240 is a UI for designating a schedule of displaying a virtual advertisement for a virtual viewpoint image. The virtual advertisement schedule setting UI 1240 has a virtual advertisement set designation area 1241 and a virtual advertisement schedule designation area 1242. In the virtual advertisement set designation area 1241, virtual advertisement sets that can be selected are displayed in a list. In the example in FIG. 12C, in the designation area 1241, a state is shown where one virtual advertisement set is selected from two or more kinds of virtual advertisement set. In the virtual advertisement schedule designation area 1242, the order of displaying virtual advertisements included in the virtual advertisement set, a box for setting the unit of updating by the number of frames, and a pulldown menu to set whether or not to perform loop reproduction are displayed. In the example in FIG. 12C, in the designation area 1242, on the upper side in the left field, a virtual advertisement set that displays the virtual advertisement AA, the virtual advertisement BB, and the virtual advertisement CC in this order is shown and on the middle side in the left field, a virtual advertisement set that displays the virtual advertisement AA and the virtual advertisement BB in this order is shown. Further, the right field shows that one frame is set as the unit of updating and the loop reproduction is set to be performed. In a case where a virtual advertisement (virtual advertisement set) display condition is set by the user operation on the virtual advertisement schedule setting UI 1240, the display condition setting unit 115 sets the virtual advertisement display condition to the parameter.

By performing the user operation for the virtual advertisement schedule setting UI 1240 in this manner, it is possible to perform the setting processing of a virtual advertisement display schedule by the display condition setting unit 115. That is, it is possible for the display condition setting unit 115 to select a virtual advertisement that is displayed in a virtual viewpoint image from the virtual advertisement data registered by the virtual advertisement setting unit 112 and schedule the display time of the selected virtual advertisement, the display interval, the display order, the number of times of display and the like. The identification number of the virtual advertisement data set to the schedule by the display condition setting unit 115 is set to the parameter to which the information relating to virtual advertisement display instructions are set along with the virtual viewpoint information and the time code along the schedule. The virtual viewpoint information includes the position of the virtual camera (virtual viewpoint), the orientation (direction) of the virtual camera (virtual viewpoint), and the angle of view corresponding to the virtual camera. Then, the parameter transmission unit 118 transmits the parameter to which various kinds of information are set by the parameter setting unit 114 to the image generation apparatus 120.

As explained above, by registering in advance a plurality of kinds of virtual advertisement data and setting identification information on the plurality of kinds of virtual advertisement data and information relating to the display condition to the parameter, it is possible to display a desired kind of virtual advertisement in a virtual viewpoint image at desired timing.

In the virtual advertisement designation example shown in FIG. 12B, it is made possible to produce a display as a virtual advertisement, in which the position of the advertisement signboard moves from the position on the left side to the position on the right side in the image.

Further, by registering in advance a plurality of kinds of virtual advertisement data, it is also made possible to display a virtual advertisement by switching a plurality of kinds of virtual advertisement.

Although the example is explained in which the plurality of virtual advertisements whose texture is the same and whose display positions are different is displayed in order in the virtual viewpoint image, the example is not limited to this. For example, it may also be possible to display virtual advertisements with a plurality of kinds of texture, whose display position is the same, or display in order a plurality of virtual advertisements with a plurality of kinds of texture, whose display positions are different, in a virtual viewpoint image.

Third Embodiment

In the present embodiment, another example of an image of a virtual advertisement is explained by using diagrams.

Figure 14A:
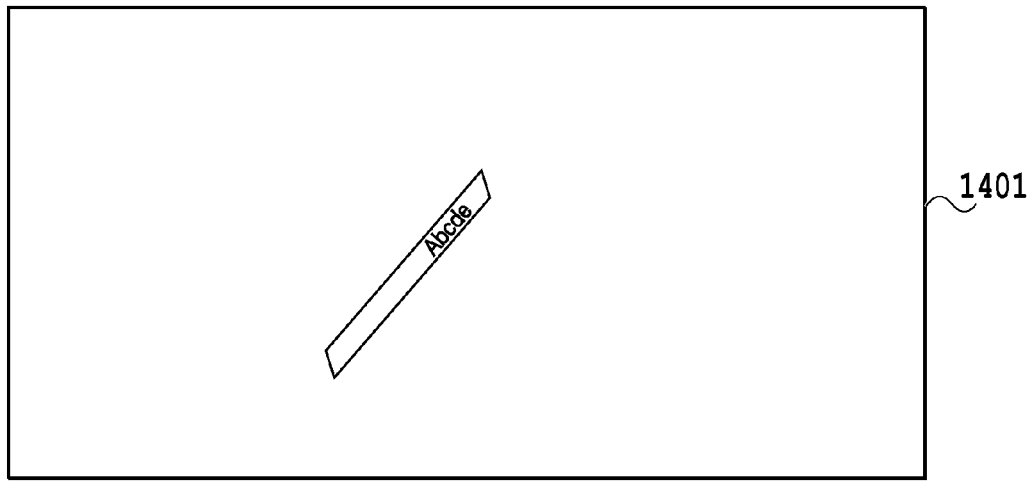
FIG. 14 to FIG. 14C are each a diagram showing an image example of a virtual advertisement that is displayed in a virtual viewpoint image.
Figure 14B:
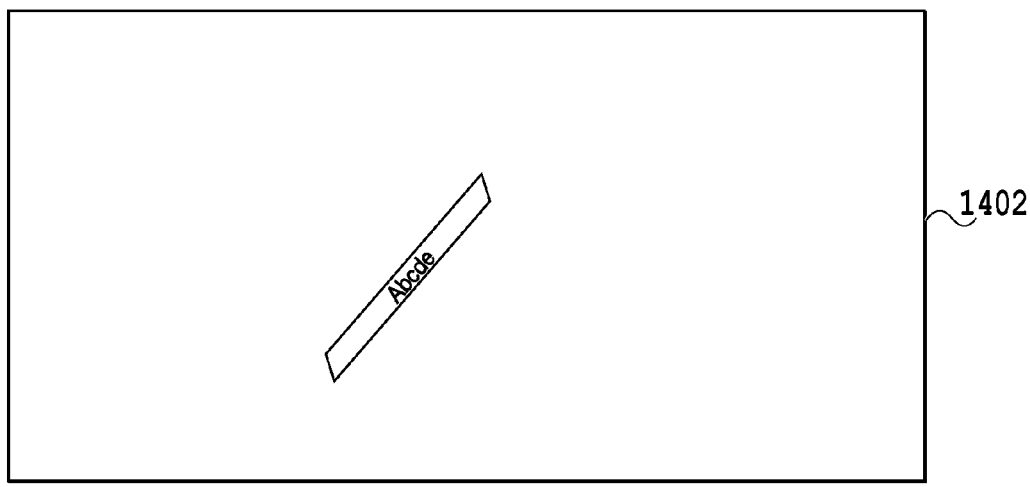
Figure 14C:
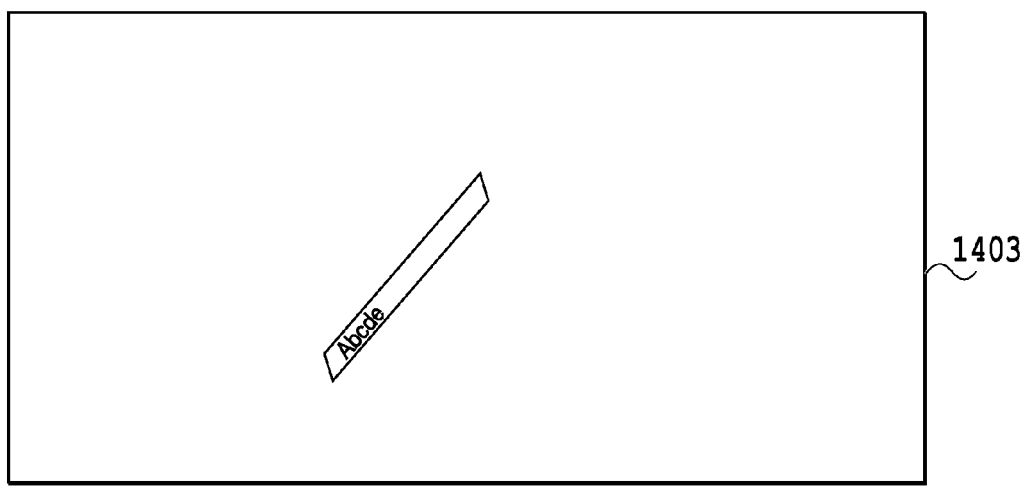

FIG. 14A to FIG. 14C are each a diagram showing an image example of virtual advertisement data, which is displayed in a virtual viewpoint image. FIG. 14A shows a case where the texture of the virtual advertisement is right-justified, FIG. 14B shows a case where the texture of the virtual advertisement is centered, and FIG. 14C shows a case where the texture of the virtual advertisement is left-justified. A virtual advertisement 1401 shown in FIG. 14A is obtained by creating image data of an advertisement signboard that does not exist in an addition-target virtual viewpoint image (basic 3D data) as a computer graphics. In the virtual advertisement 1401, the texture "Abcde" is described (displayed) right-justified on the advertisement signboard. A virtual advertisement 1402 shown in FIG. 14B is obtained by creating image data of an advertisement signboard that does not exist in an addition-target virtual viewpoint image (basic 3D data) as a computer graphics. In the virtual advertisement 1402, the texture "Abcde" is described (displayed) centered on the advertisement signboard. A virtual advertisement 1403 shown in FIG. 14C is obtained by creating imaged data of an advertisement signboard that does not exist in an addition-target virtual viewpoint image (basic 3D data) as a computer graphics. In the virtual advertisement 1403, the texture "Abcde" is described (displayed) left-justified on the advertisement signboard. That is, the above-described virtual advertisements 1401, 1402, and 1403 show examples in which although the 3D model representing the signboard of the virtual advertisement is the same, only the description positions (display positions) of the texture are different.

In a case of the present embodiment as well, it is possible to obtain the effects described below by the same sequence as the sequence shown in FIG. 10. That is, by registering the data of the virtual advertisements 1401, 1402, and 1403 in the image generation apparatus 120 and setting the display condition of displaying the virtual advertisement desired to be displayed by switching to the parameter including without virtual advertisement, it is possible to switch to the virtual advertisement desired to be displayed to another. Further, in the present embodiment, the texture of the virtual advertisements 1401 to 1403 exists in the vicinity of the right side, the center, and the left side, and therefore, it is made possible to produce a display in which the contents of the advertisement move by switching the displays in order of the virtual advertisement 1401, the virtual advertisement 1402, and the virtual advertisement 1403.

As explained above, according to the present embodiment, by setting the virtual advertisement display condition to the parameter by the user operation for the information processing apparatus 110, it is made possible to switch between display and nondisplay of a virtual advertisement and produce a display by switching the kinds of virtual advertisement.

Fourth Embodiment

In the present embodiment, an aspect is explained by using diagrams, in which by setting in advance the time to display a virtual advertisement as a schedule, the immediate control by a user is not necessary and control to switch the kinds of virtual advertisement to be displayed in a virtual viewpoint image is performed in accordance with the schedule.

The function units of the information processing apparatus of the image processing system of the present embodiment, which are different from those of the first embodiment, are explained by using FIG. 1B. The display condition setting unit of the present embodiment receives the time code indicating the virtual advertisement display time, which is set by the time code setting unit, in addition to receiving the virtual advertisement that is set by the virtual advertisement setting unit 112 and the information that is generated in accordance with the input operation received by the operation reception unit. Next, the display condition setting unit of the present embodiment associates the parameter to which a predetermined virtual advertisement display condition is set and the time code indicating the display time (display start time and display end time) of the predetermined virtual advertisement with each other and sends them to the parameter transmission unit of the present embodiment. In a case where the display start time of the predetermined virtual advertisement, which is indicated by the time code, is reached, the parameter transmission unit of the present embodiment transmits the corresponding parameter (with predetermined virtual advertisement) to the parameter reception unit 123 of the image generation apparatus 120. Further, in a case where the display end time of the predetermined virtual advertisement, which is indicated by the time code, is reached, the parameter transmission unit of the present embodiment transmits the corresponding parameter (without predetermined virtual advertisement) to the parameter reception unit 123 of the image generation apparatus 120.

Further, the flow of processing performed by the information processing apparatus in a case where a schedule is set as the above-described virtual advertisement display condition is explained for the processing different from that of the first embodiment by using FIG. 4B.

At S413, the operation reception unit 111 receives the user operation for inputting the parameter, that is, the user operation for inputting (registering) the schedule relating to the display-target virtual advertisement and to which the display start time and the display end time of the virtual advertisement are set.

At S414, the operation reception unit 111 determines whether or not the current time is included in the range from the display start time to the display end time of the virtual advertisement, which are set to the schedule received at S413. In a case where determination results that the current time is included in the display time range of the virtual advertisement, which is set to the schedule, are obtained (YES at S414), the processing moves to S415. On the other hand, in a case where determination results that the current time is not included in the display time range of the virtual advertisement, which is set to the schedule, are obtained (NO at S414), the processing skips S415 and moves to S416.

As described above, by setting in advance the virtual advertisement display time as a schedule, it is possible for the information processing apparatus 110 to transmit the parameter (with virtual advertisement) or the parameter (without virtual advertisement), which is set in accordance with the schedule, to the image generation apparatus 120.

<Virtual Advertisement Display Condition Setting UI>

Figure 15:
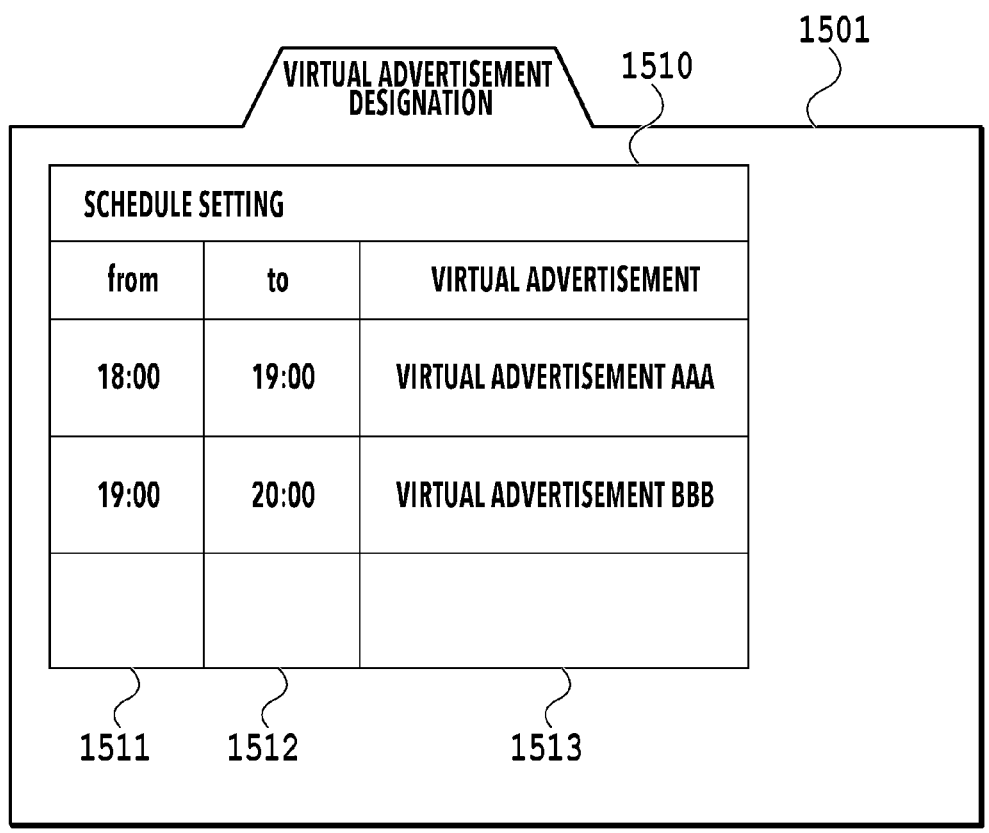
FIG. 15 is a diagram showing a user interface example.

A user interface (UI) example for setting a virtual advertisement display condition (display time) for a virtual viewpoint image is explained by using diagrams. FIG. 15 is a diagram showing a virtual advertisement display condition setting UI example.

A virtual advertisement display condition setting UI 1501 has a Schedule Setting field 1510 for setting the time to display a virtual advertisement. The Schedule Setting field 1510 has a start time setting field 1511, an end time setting field 1512, and a display target setting field 1513. The start time setting field 1511 is an area in which the time to start a display of a target virtual advertisement is set by the user operation. The end time setting field 1512 is an area in which the time to end a display of a target virtual advertisement is set by the user operation. The display target setting field 1513 is an area in which the kind of virtual advertisement to be displayed in a virtual viewpoint image is set by the user operation.

In a case where a virtual advertisement display schedule is set by the user operation on the display condition setting UI, information relating to the virtual advertisement display condition is set to the parameter by the display condition setting unit 115.

For example, a case is explained where the broadcast time of a game of soccer is from 18:00 to 20:00 and the setting is performed so that from 18:00 to 19:00, a virtual advertisement AAA is displayed in a virtual viewpoint image and from 19:00 to 20:00, a virtual advertisement BBB is displayed in the virtual viewpoint image As shown in FIG. 15, by the user operation, in the start time setting field 1511, "18:00" is set, in the end time setting field 1512, "19:00" is set, and in the display target setting field 1513, "virtual advertisement AAA" is set. Further, in the start time setting field 1511, "19:00" is set, in the end time setting field 1512, "20:00" is set, and in the display target setting field 1513, "virtual advertisement BBB" is set.

The information relating to the set virtual advertisement display condition is set to the parameter in accordance with reaching of the designated time by the display condition setting unit of the parameter setting unit and the parameter is transmitted to the image generation apparatus 120 by the parameter transmission unit.

Consequently, by setting the virtual advertisement display schedule as described above, the control is performed so that the virtual advertisement AAA is displayed in the virtual viewpoint image from 18:00 to 19:00 and the virtual advertisement BBB is displayed in the virtual viewpoint image from 19:00 to 20:00.

As explained above, according to the present embodiment, by setting in advance the time to display a virtual advertisement as a schedule, the immediate operation by a user is not necessary and it is made possible to perform the control to switch the kinds of virtual advertisement to be displayed in a virtual viewpoint image in accordance with the schedule.

In the above-described embodiment, although explanation is given by taking the timer setting by time as an example of the display condition, it is also possible to set the time elapsed from instructions to display a virtual advertisement as the display condition, not limited only to the time.

Further, it is also possible to use the display condition that combines the virtual advertisement display instructions setting by a timer and the virtual advertisement display instructions setting at arbitrary timing by an operator as the display condition. For example, in the state where the schedule is set so that the virtual advertisement AAA is displayed in the virtual viewpoint image from 18:00 to 19:00 and the virtual advertisement BBB is displayed in the virtual viewpoint image from the 19:00 to 20:00, it is also possible to combine the display instructions setting of a virtual advertisement that is displayed next. That is, it is also possible to switch the virtual advertisement that is displayed by the operation of an operator to the virtual advertisement A only during the period of a penalty kick.

Further, it is also possible to apply the above-described embodiment to a system that bills the advertiser of a virtual advertisement for the charge in accordance with the display time of the virtual advertisement by a timer.

Fifth Embodiment

In the present embodiment, an aspect is explained by using diagrams, in which a 3D model and moving image data of a virtual advertisement are registered in advance and a virtual advertisement whose texture moves is displayed in a virtual viewpoint image by designating the moving image data or the frame number of the moving image data, which are already registered along with the parameter.

A virtual advertisement data registration example and a virtual viewpoint image generation parameter example are explained by using diagrams. FIG. 16A and FIG. 16B are each a diagram showing a virtual advertisement data registration example and a virtual viewpoint image generation parameter example and FIG. 16A shows a 3D model format example of virtual advertisement data that is transmitted at the time of registration and FIG. 16B shows a format example of parameter (with virtual advertisement) data. As shown in FIG. 16A, in the 3D model format of virtual advertisement data, the file name and the file size of each of the obj file, the mtl file, and an mp4 file are designated. The obj file and the mtl file are the same as the obj file and the mtl file explained by using FIG. 6A to FIG. 6C, and therefore, their explanation is omitted. In the mp4 file, moving image data (parameter) of a 3D model of a virtual advertisement is stored. Here, a parameter (with virtual advertisement) data example is explained by using diagrams. In the format of the parameter (with virtual advertisement) data shown in FIG. 16B, as virtual advertisement display instructions, "AAA: FWD" representing "advertisement ID: moving image reproduction method" is designated. Here, FWD represents the uniform reproduction in the forward direction. By designating the reproduction method of a moving image at the time of setting the various kinds of information to the parameter as described above, it is made possible to display a moving virtual advertisement.

As explained above, according to the present embodiment, by registering in advance a moving image as virtual advertisement data and setting identification information on the virtual advertisement data and information relating to the display condition to the parameter, the following effects are obtained. It is possible to generate a virtual advertisement (moving image data)-added virtual viewpoint image or a virtual viewpoint image without virtual advertisement in accordance with the information that is set to the parameter. Because of this, it is possible to display an effective virtual advertisement suitable to a scene in a virtual viewpoint image by switching between display and nondisplay of a virtual advertisement real time for each frame. That is, it is possible to generate a virtual viewpoint image in which a virtual advertisement (moving image data) is displayed at a desired position at desired timing.

Further, in the first to fifth embodiments, although explanation is given by taking advertisement information (virtual advertisement) as an example of additional information that is added to basic 3D data (moving image file), additional information is not limited to advertisement information. As another example of additional information that is added to basic 3D data, it may also be possible to add information on a player (in the following, referred to as player information) captured in a virtual viewpoint image. In a case where player information is added to a moving image file, in the virtual advertisement storage unit 122, the data type, the number of pieces of data, and information relating to the address of a player information database are stored. The data type is information indicating that the additional information is information relating to a player. The number of pieces of data is the number of pieces of player information. The information relating to the address of a player information database is address information for connecting to a database in which the player information is accumulated. In a case where the address information such as this is not stored in the virtual advertisement storage unit 122, in the virtual advertisement storage unit 122, the player information ID, the player information model data of player information, the player information material data, the information on a pasting area of player information on a virtual viewpoint video and priority, and the like are stored. As described above, it is possible to apply the present embodiments also to information other than advertisement information.

Other Embodiments

In the above, although the information processing apparatus 110 is explained, which performs the setting of advertisement data and the display condition thereof, the setting of information relating to the display condition to the parameter, and the transmission of the data to the image generation apparatus 120, the information processing apparatus is not limited to this. The information processing apparatus may have a configuration in which the reading of virtual advertisement data that is added to a virtual viewpoint image from the image generation apparatus 120, the setting of the display condition thereof, the setting of information relating to the display condition to the parameter, and transmission to the image generation apparatus 120 are performed.

Further, the object of the present invention is also achieved by supplying a storage medium storing computer program codes that implement the functions described previously to a system and the system reading and executing the computer program codes. In this case, the computer program codes themselves read from the storage medium implement the functions of the embodiments described previously and the storage medium storing the computer program codes configures the present disclosure. Further, a case is also included where an operating system (OS) or the like running on a computer performs part of all of the actual processing based on instructions of the program codes and by the processing, the functions described previously are implemented.

Furthermore, it may also be possible to implement the image processing system of the present embodiments by the following aspect. That is, computer program codes read from the storage medium are written to a function extension card inserted into the computer or a memory provided in a function extension unit connected to the computer. Then, a case is also included where the CPU or the like provided in the function extension card or the function extension unit performs part of all of the actual processing based on instructions of the computer program codes, and thereby, the functions described previously are implemented.

In a case where the present disclosure is applied to the above-described storage medium, in the storage medium, the computer program code corresponding to the flowchart explained previously is stored.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiments, it is possible to generate a virtual viewpoint image in which desired information is added to a desired position.

This application claims the benefit of Japanese Patent Application No. 2020-203296, filed Dec. 8, 2020, which is hereby incorporated by reference wherein in its entirety.

What is claimed is:

1. An information processing apparatus comprising:
one or more processors functioning, by executing instructions stored in one or more memories, as the following units:
a setting unit configured to set a parameter with which a display condition of additional information that is displayed in a virtual viewpoint image, identification information indicating the additional information, and virtual viewpoint information on a virtual viewpoint image that is generated are associated;
a display unit configured to display a user interface to select the parameter with an image indicating the display condition; and
an output unit configured to output the parameter that is set by the setting unit;
wherein the user interface receives a user input,
wherein the setting unit sets the parameter in accordance with a user input that is received via the user interface,
wherein in a case where the parameter associated with multiple pieces of additional information is set by the setting unit, the output unit outputs the parameter so that the multiple pieces of additional information are output in a predetermined order.

2. The information processing apparatus according to claim 1, wherein
the setting unit sets the parameter for each frame in which an image generation apparatus generates the virtual viewpoint image.

3. The information processing apparatus according to claim 1, wherein
the virtual viewpoint information is information including at least one of a position of a virtual viewpoint, a view direction from the virtual viewpoint, and an angle of view corresponding to the virtual viewpoint.

4. The information processing apparatus according to claim 1, wherein
the setting unit further sets, as the parameter, a time code of the virtual viewpoint image that is generated by an image generation apparatus.

5. The information processing apparatus according to claim 1, wherein
the additional information includes information relating to an advertisement that is indicated by a 3D model format or texture.

6. The information processing apparatus according to claim 1, wherein
the additional information includes information relating to an object included in the virtual viewpoint image, which is indicated by a 3D model format or texture.

7. The information processing apparatus according to claim 1, wherein
the display condition of the additional information includes at least one of a display time of the additional information, a display interval of the additional information, a display order of the additional information, and a number of times of display of the additional information.

8. An information processing method comprising:
setting a parameter with which a display condition of additional information that is displayed in a virtual viewpoint image, identification information indicating the additional information, and virtual viewpoint information on a virtual viewpoint image that is generated are associated;
displaying a user interface to select the parameter with an image indicating the display condition; and
outputting the parameter that is set in the setting;
wherein the user interface receives a user input,
wherein the parameter is set in accordance with a user input that is received via the user interface,
wherein in a case where the parameter associated with multiple pieces of additional information is set, the parameter is output so that the multiple pieces of additional information are output in a predetermined order.

9. A non-transitory computer readable storage medium storing a program for causing a computer to perform a control method of controlling an information processing apparatus comprising:
one or more processors functioning, by executing instructions stored in one or more memories, as the following units:
a setting unit configured to set a parameter with which a display condition of additional information that is displayed in a virtual viewpoint image, identification information indicating the additional information, and virtual viewpoint information on a virtual viewpoint image that is generated are associated; and
a display unit configured to display a user interface to select the parameter with an image indicating the display condition;
an output unit configured to output the parameter that is set by the setting unit;
wherein the user interface receives a user input,
wherein the setting unit sets the parameter in accordance with a user input that is received via the user interface,
wherein in a case where the parameter associated with multiple pieces of additional information is set by the setting unit, the output unit outputs the parameter so that the multiple pieces of additional information are output in a predetermined order.

* * * * *